(12) United States Patent  
Eckert et al.

(10) Patent No.: US 7,761,500 B1  
(45) Date of Patent: Jul. 20, 2010

(54) URL BASED COMMUNICATION PROTOCOL FROM A CLIENT COMPUTER TO A NETWORK DEVICE

(75) Inventors: Toerless Eckert, Mountain View, CA (US); Liming Wei, Fremont, CA (US); Dino Farinacci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/515,941

(22) Filed: Feb. 29, 2000

(51) Int. Cl.
*G06F 13/00* (2006.01)

(52) U.S. Cl. .................. 709/203; 709/225; 709/226; 709/238; 709/239

(58) Field of Classification Search .......... 709/203, 709/225, 226, 238, 239
See application file for complete search history.

(56) References Cited

U.S. PATENT DOCUMENTS

| | | | | |
|---|---|---|---|---|
| 5,636,216 | A * | 6/1997 | Fox et al. | 370/402 |
| 5,854,901 | A * | 12/1998 | Cole et al. | 709/245 |
| 5,901,286 | A * | 5/1999 | Danknick et al. | 709/203 |
| 6,006,264 | A * | 12/1999 | Colby et al. | 709/226 |
| 6,055,236 | A | 4/2000 | Nessett et al. | 370/389 |
| 6,144,996 | A * | 11/2000 | Starnes et al. | 709/217 |
| 6,226,677 | B1 * | 5/2001 | Slemmer | 709/227 |
| 6,226,684 | B1 * | 5/2001 | Sung et al. | 709/238 |
| 6,415,323 | B1 * | 7/2002 | McCanne et al. | 709/225 |
| 6,449,251 | B1 * | 9/2002 | Awadallah et al. | 370/229 |
| 6,625,624 | B1 * | 9/2003 | Chen et al. | 707/204 |
| 7,143,439 | B2 * | 11/2006 | Cooper et al. | 726/11 |
| 7,433,070 | B2 * | 10/2008 | Koppich et al. | 358/1.15 |

OTHER PUBLICATIONS

Reynolds et al. RFC 1700 published by "the Internet Engineering Task Force", pp. 1-56, Oct. 1994.*

* cited by examiner

*Primary Examiner*—Robert B Harrell
(74) *Attorney, Agent, or Firm*—Cesari and McKenna, LLP

(57) ABSTRACT

A method of signaling in a computer network uses interception by a network device of a message transmitted by a client computer to a server. The message contains a Universal Resource Locator (URL), the URL having a reserved port designation. The network device parses the URL and intercepts the message in response to finding the reserved port designation in the URL. The network device executes a command, where the command is carried in a field of the intercepted message. The client computer receives the URL having the reserved port designation in a HTML file transmitted to the client computer by the server. The message containing the URL is transmitted by the client computer in response to a user requesting a resource displayed in a web page displayed by the client computer. A second web page is transmitted to the client computer by a server receiving a request for services, and the URL containing the port designation is written into the second web page so that the URL is executed automatically as the second web page is received by the client's browser. The method transmits a redirect message by the network device to the client computer, the redirect message redirecting to an address of a web page without the reserved port designation in the URL to carry information to the server.

42 Claims, 10 Drawing Sheets

URL BASED COMMUNICATION PROTOCOL FROM A CLIENT COMPUTER TO A NETWORK DEVICE

FIELD OF THE INVENTION

This invention relates to transmission of messages by a client computer connected to a computer network through a network device, and more particularly to communication from the client computer to the network device, and from a server to the network device.

BACKGROUND

The World Wide Web (WWW) is a set of tools and constructs which simplify communication between a user, using a client computer, and a server holding information which the user wishes to receive. The user's client computer and the server computer are linked together by a computer network. The user's client computer runs a computer program called a "browser", files stored on the server are written in Hypertext Markup Language (HTML) so that the browser will interpret the file after it is transferred to the client computer, and display the file as a "Web Page". The address of the Web Page is presented to the browser in Universal Resource Locator format or (URL), and the browser interprets this address to set up a communications session from the client to the server to transmit a request to the server, and the server reads the URL from the request in order to transmit a response to the client. The protocol used by the browser and the server application is referred to as the Hypertext Transfer Protocol (HTTP. The communications session is usually set up as a TCP/IP session, however any reliable packet transfer protocol may be used to communicate between a browser running on a client computer, and a server.

The following Requests for Comments (RFC) published by the Internet Engineering Task Force (IETF) describe various aspects of the WWW constructs: RFC 1945, "Hypertext Transfer Protocol—HTTP/1.0"; RFC 1630 "Universal Resource Identifiers in WWW"; RFC 1738 "Uniform Resource Locators (URL)"; RFC 1808 "Relative Uniform Resource Locators"; all disclosures of which are incorporated herein by reference. The Hyper Text Markup Language (HTML) is described in the book by Tim Evans, 10 *Minute Guide to HTML 3.2, Second Edition*, published by Que, a Division of Macmillan Computer Publishing, New York, Copyright date of 1996, all disclosures of which are incorporated herein by reference.

Network devices such as bridges (layer 2 devices), routers (layer 3 devices), layer four switches, etc. make up the computer network connecting the client computer to the server. For example, the client computer may be a desktop computer located in New York City, and the server computer may be located in California. A computer network, for example the Internet, may be used to couple the client computer with the server. A large number of network devices may be in a chain which forwards a packet from the client to the server, different packets may follow different chains of network devices, and return packets from the server to the client may follow a different chain of network devices. In any case, the client will usually be connected to a first network device, usually a router, and all packets to or from the client will pass through this first network device.

It is desirable to directly address a network device during the course of exchange of packets during a World Wide Web (WWW) communications session. For example, it would be convenient for a client to specify a class of service, for a client to specify a source of a multicast group, for a client to specify a priority for a session, etc. by communicating with a network device. However, all of the WWW protocols ignore network devices, and simply transmit packets using a routable protocol. That is, the network devices are transparent to a WWW communications session between a client computer and a server.

There is needed a simple protocol for a client computer and a server computer to communicate with a network device during a WWW communications session.

SUMMARY OF THE INVENTION

A method of signaling in a computer network uses interception by a network device of a message transmitted by a client computer to a server. The message contains a Universal Resource Locator (URL), the URL having a reserved port designation. The network device parses the URL and intercepts the message in response to finding the reserved port designation in the URL. The network device executes a command, where the command is carried in a field of the intercepted message. The client computer receives the URL having the reserved port designation in a HTML file transmitted to the client computer by the server. The message containing the URL is transmitted by the client computer in response to a user requesting a resource displayed in a web page displayed by the client computer. A second web page is transmitted to the client computer by a server receiving a request for services, and the URL containing the port designation is written into the second web page so that the URL is executed automatically as the second web page is received by the client's browser. The method transmits a redirect message by the network device to the client computer, the redirect message redirecting to an address of a web page without the reserved port designation in the URL to carry information to the server. The network device may be any convenient network device such as a router, a switch, a layer 4 switch, etc. Efficient implementation of the invention requires use of a field for signaling the network device, where the field is parsed by a high speed unit within the network device. An implementation of the invention uses a "port" field in the URL to signal the network device, and so the packet transfer protocol must include a "port" field for this implementation of the invention, as does the TCP/IP protocol for Hyper Text Transfer Protocol. Also, efficient implementation of the invention requires that the network device parse the URL, as do modern layer 4 switches and routers. Uses of the invention include establishing a multicast group forwarding only packets transmitted by a designated source computer, establishing a designated quality of service for a communications session, and other uses of a client computer commanding a network device to take action.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

World Wide Web Features

Figure 1:
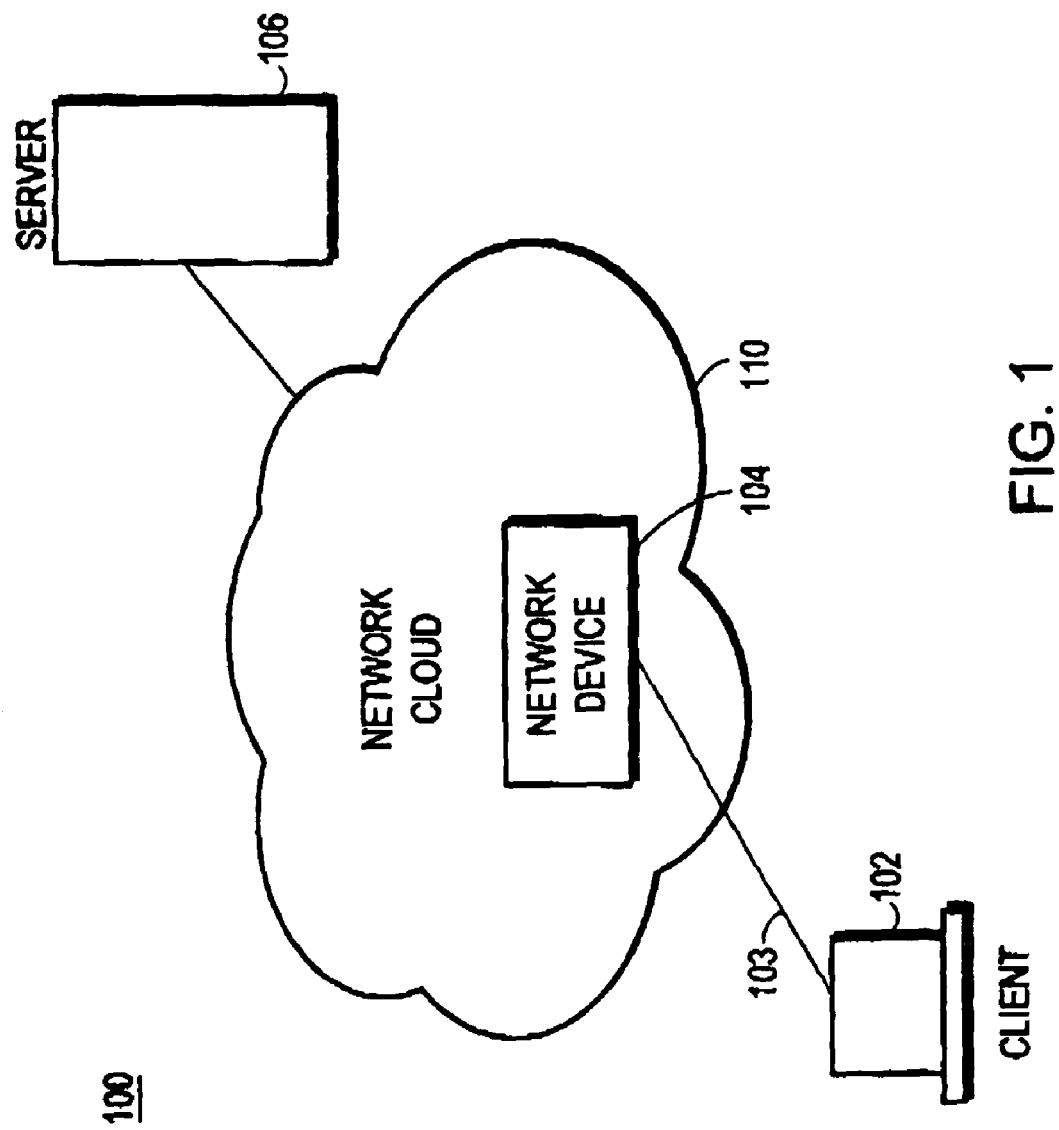
FIG. 1 is a block diagram of a computer network using the invention.

Some features of the standards used in the World Wide Web (WWW) are first described. The description is taken from RFC 1738 and RFC 1945, both published by the Internet Engineering Task Force at the URL www.ietf.org. The following descriptions of URLs is taken from RFC 1738.

URL

In general, URLs are written as follows:

<scheme>:<scheme-specific-part>

A URL contains the name of the scheme being used (<scheme>) followed by a colon and then a string (the <scheme-specific-part>) whose interpretation depends on the scheme.

The characters ";", "/", "?", ":", "@", "=" and "&" are the characters which may be reserved for special meaning within a scheme.

The mapping for some existing standard and experimental protocols is outlined. The schemes covered are:

| | |
|---|---|
| ftp | File Transfer protocol |
| http | Hypertext Transfer Protocol |
| gopher | The Gopher protocol |
| mailto | Electronic mail address |
| news | USENET news |
| nntp | USENET news using NNTP access |
| telnet | Reference to interactive sessions |
| wais | Wide Area Information Servers |
| file | Host-specific file names |
| prospero | Prospero Directory Service |

While the syntax for the rest of the URL may vary depending on the particular scheme selected, URL schemes that involve the direct use of an IP-based protocol to a specified host on the Internet use a common syntax for the scheme-specific data:

//<user>:<password>@<host>:<port>/<url-path>

Some or all of the parts "<user>:<password>@", ":<password>", ":<port>", and "/<url-path>" may be excluded. The scheme specific data start with a double slash "//" to indicate that it complies with the common Internet scheme syntax. The different components obey the following rules:

user

An optional user name. Some schemes (e.g., ftp) allow the specification of a user name.

password

An optional password. If present, it follows the user name separated from it by a colon.

The user name (and password), if present, are followed by a commercial at-sign "@". Within the user and password field, any ":", "@", or "I" must be encoded.

Note that an empty user name or password is different than no user name or password; there is no way to specify a password without specifying a user name. E.g., <URL: ftp://@host.com/> has an empty user name and no password, <URL:ftp://host.com/> has no user name, while <URL:ftp://foo:@host.com/> has a user name of "foo" and an empty password.

host

The fully qualified domain name of a network host, or its IP address as a set of four decimal digit groups separated by ".". Fully qualified domain names take the form as described in Section 3.5 of RFC 1034 and Section 2.1 of RFC 1123: a sequence of domain labels separated by ".", each domain label starting and ending with an alphanumerical character and possibly also containing "-" characters. The rightmost domain label will never start with a digit, though, which syntactically distinguishes all domain names from the IP addresses.

port

The port number to connect to. Most schemes designate protocols that have a default port number. Another port number may optionally be supplied, in decimal, separated from the host by a colon. If the port is omitted, the colon is as well.

url-path

The rest of the locator consists of data specific to the scheme, and is known as the "url-path". It supplies the details of how the specified resource can be accessed. Note that is the "/" between the host (or port) and the url-path is NOT part of the url-path.

The url-path syntax depends on the scheme being used, as does the manner in which it is interpreted.

The FTP URL scheme is used to designate files and directories on Internet hosts accessible using the FTP protocol (RFC 959).

A FTP URL follow the syntax described in Section 3.1. If :<port> is omitted, the port defaults to 21.

A user name and password may be supplied; they are used in the ftp "USER" and "PASS" commands after first making the connection to the FTP server. If no user name or password is supplied and one is requested by the FTP server, the conventions for "anonymous" FTP are to be used, as follows:

The user name "anonymous" is supplied.

The password is supplied as the Internet e-mail address of the end user accessing the resource.

If the URL supplies a user name but no password, and the remote server requests a password, the program interpreting the FTP URL should request one from the user.

HTTP

The HTTP URL scheme is used to designate Internet resources accessible using HTTP (HyperText Transfer Protocol).

An HTTP URL takes the form:

http://<host>:<port>/<path>?<searchpart> where <host> and <port> are as described in Section 3.1. If :<port> is omitted, the port defaults to 80. No user name or password is allowed. <path> is an HTTP selector, and <searchpart> is a query string. The <path> is optional, as is the <searchpart> and its preceding "?". If neither <path> nor <searchpart> is present, the "/" may also be omitted.

Within the <path> and <searchpart> components, "/", ";", "?" are reserved. The "/" character may be used within HTTP to designate a hierarchical structure.

Gopher

The Gopher URL scheme is used to designate Internet resources accessible using the Gopher protocol.

The base Gopher protocol is described in RFC 1436 and supports items and collections of items (directories). The Gopher+ protocol is a set of upward compatible extensions to the base Gopher protocol and is described in. Gopher+ supports associating arbitrary sets of attributes and alternate data representations with Gopher items.

Gopher URLs accommodate both Gopher and Gopher+ items and item attributes.

Gopher URL Syntax

A Gopher URL takes the form:
gopher://<host>:<port>/<gopher-path> where <gopher-path> is one of:
<gophertype><selector>
<gophertype><selector>%09<search>
<gophertype><selector>%09<search>%09<gopher+_string>

If :<port> is omitted, the port defaults to 70. <gophertype> is a single-character field to denote the Gopher type of the resource to which the URL refers. The entire <gopher-path> may also be empty, in which case the delimiting "/" is also optional and the <gophertype> defaults to "1".

<selector> is the Gopher selector string. In the Gopher protocol, Gopher selector strings are a sequence of octets which may contain any octets except 09 hexadecimal (US-ASCII HT or tab) OA hexadecimal (US-ASCII character LF), and OD (US-ASCII character CR).

Gopher clients specify which item to retrieve by sending the Gopher selector string to a Gopher server.

Within the <gopher-path>, no characters are reserved. Note that some Gopher <selector> strings begin with a copy of the <gophertype> character, in which case that character will occur twice consecutively. The Gopher selector string may be an empty string; this is how Gopher clients refer to the top-level directory on a Gopher server.

Specifying URLs for Gopher Search Engines

If the URL refers to a search to be submitted to a Gopher search engine, the selector is followed by an encoded tab (%09) and the search string. To submit a search to a Gopher search engine, the Gopher client sends the <selector> string (after decoding), a tab, and the search string to the Gopher server.

mailto URL takes the form:
mailto:<rfc822-addr-spec> where <rfc822-addr-spec> is (the encoding of an) addr-spec, as specified in RFC 822.

News

The news URL scheme is used to refer to either news groups or individual articles of USENET news, as specified in RFC 1036.

A news URL takes one of two forms:
news:<newsgroup-name>
news:<message-id>

A <newsgroup-name> is a period-delimited hierarchical name, such as to "comp.infosystems.www.misc". A <message-id> corresponds to the Message-ID of section 2.1.5 of RFC 1036, without the enclosing "<" and ">"; it takes the form <unique>@<full_domain_name>. A message identifier may be distinguished from a news group name by the presence of the commercial at "@" character. No additional characters are reserved within the components of a news URL.

If <newsgroup-name> is "*" (as in <URL:news:*>), it is used to refer to "all available news groups".

The news URLs are unusual in that by themselves, they do not contain sufficient information to locate a single resource, but, rather, are location-independent.

NNTP

The nntp URL scheme is an alternative method of referencing news articles, useful for specifying news articles from NNTP servers (RFC 977).

A nntp URL take the form:
nntp://<host>:<port>/<newsgroup-name>/<article-number> where <host> and <port> are as described in RFC 1945 Section 3.1. If :<port> is omitted, the port defaults to 119.

The <newsgroup-name> is the name of the group, while the <article-number> is the numeric id of the article within that newsgroup.

Telnet

The Telnet URL scheme is used to designate interactive services that may be accessed by the Telnet protocol.

A telnet URL takes the form:
telnet://<user>:<password>@<host>:<port>/ and, the final "/" character may be omitted.

If :<port> is omitted, the port defaults to 23. The :<password> can be omitted, as well as the whole <user>:<password> part.

The telenet URL does not designate a data object, but rather an interactive service. Remote interactive services vary widely in the means by which they allow remote logins; in practice, the <user> and <password> supplied are advisory only: clients accessing a telnet URL merely advise the user of the suggested username and password.

HTTP

The Hypertext Transfer Protocol (HTTP) is described in RFC 1945. The following description is taken, substantially verbatim from RFC 1945. Also, additional details of HTTP are given in RFC 1945.

The Hypertext Transfer Protocol (HTTP) is an application-level protocol with the lightness and speed necessary for distributed, collaborative, hypermedia information systems.

HTTP is also used as a generic protocol for communication between user agents and proxies/gateways to other Internet protocols, such as SMTP, NNTP, FTP, Gopher, and WAIS, allowing basic hypermedia access to resources available from diverse applications and simplifying the implementation of user agents.

Terminology

This specification uses a number of terms to refer to the roles played by participants in, and objects of, the HTTP communication.

Connection

A transport layer virtual circuit established between two application programs for the purpose of communication.

Message

The basic unit of HTTP communication, consisting of a structured sequence of octets matching the syntax defined in RFC 1945 Section 4 and transmitted via the connection.

Request

An HTTP request message (as defined in RFC 1945 Section 5).

Response

An HTTP response message (as defined in RFC 1945 Section 6).

Resource

A network data object or service which can be identified by a URI or URL (RFC 1945 Section 3.2).

Entity

A particular representation or rendition of a data resource, or reply from a service resource, that may be enclosed within a request or response message. An entity consists of meta-information in the form of entity headers and content in the form of an entity body.

Client

An application program that establishes connections for the purpose of sending requests.

User Agent

The client which initiates a request. These are often browsers, editors, spiders (web-traversing robots), or other end user tools.

Server

An application program that accepts connections in order to service requests by sending back responses.

Origin Server

The server on which a given resource resides or is to be created.

Proxy

An intermediary program which acts as both a server and a client for the purpose of making requests on behalf of other clients. Requests are serviced internally or by passing them, with possible translation, on to other servers. A proxy must interpret and, if necessary, rewrite a request message before forwarding it. Proxies are often used as client-side portals through network firewalls and as helper applications for handling requests via protocols not implemented by the user agent.

Gateway

A server which acts as an intermediary for some other server. Unlike a proxy, a gateway receives requests as if it were the origin server for the requested resource; the requesting client may not be aware that it is communicating with a gateway. Gateways are often used as server-side portals through network firewalls and as protocol translators for access to resources stored on non-HTTP systems.

Tunnel

A tunnel is an intermediary program which is acting as a blind relay between two connections. Once active, a tunnel is not considered a party to the HTTP communication, though the tunnel may have been initiated by an HTTP request. The tunnel ceases to exist when both ends of the relayed connections are closed. Tunnels are used when a portal is necessary and the intermediary cannot, or should not, interpret the relayed communication.

Cache

A program's local store of response messages and the subsystem that controls its message storage, retrieval, and deletion. A cache stores cacheable responses in order to reduce the response time and network bandwidth consumption on future, equivalent requests. Any client or server may include a cache, though a cache cannot be used by a server while it is acting as a tunnel.

Any given program may be capable of being both a client and a server; our use of these terms refers only to the role being performed by the program for a particular connection, rather than to the program's capabilities in general. Likewise, any server may act as an origin server, proxy, gateway, or tunnel, switching behavior based on the nature of each request.

Overall Operation

The HTTP protocol is based on a request/response paradigm. A client establishes a connection with a server and sends a request to the server in the form of a request method, URI, and protocol version, followed by a MIME-like message containing request modifiers, client information, and possible body content. The server responds with a status line, including the message's protocol version and a success or error code, followed by a MIME-like message containing server information, entity meta-information, and possible body content.

Most HTTP communication is initiated by a user agent and consists of a request to be applied to a resource on some origin server. In the simplest case, this may be accomplished via a single connection (v) between the user agent (UA) and the origin server (O).

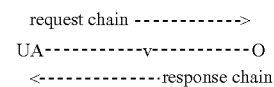

A more complicated situation occurs when one or more intermediaries are present in the request/response chain. There are three common forms of intermediary: proxy, gateway, and tunnel. A proxy is a forwarding agent, receiving requests for a URI in its absolute form, rewriting all or parts of the message, and forwarding the reformatted request toward the server identified by the URI. A gateway is a receiving agent, acting as a layer above some other server(s) and, if necessary, translating the requests to the underlying server's protocol. A tunnel acts as a relay point between two connections without changing the messages; tunnels are used when the communication needs to pass through an intermediary (such as a firewall) even when the intermediary cannot understand the contents of the messages.

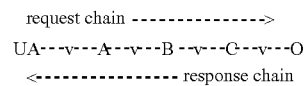

The figure above shows three intermediaries (A, B, and C) between the user agent and origin server. A request or response message that travels the whole chain must pass through four separate connections. This distinction is important because some HTTP communication options may apply only to the connection with the nearest, non-tunnel neighbor, only to the end-points of the chain, or to all connections along the chain. Although the diagram is linear, each participant may be engaged in multiple, simultaneous communications. For example, B may be receiving requests from many clients other than A, and/or forwarding requests to servers other than C, at the same time that it is handling A's request.

Any party to the communication which is not acting as a tunnel may employ an internal cache for handling requests. The effect of a cache is that the request/response chain is shortened if one of the participants along the chain has a cached response applicable to that request. The following illustrates the resulting chain if B has a cached copy of an earlier response from O (via C) for a request which has not been cached by UA or A.

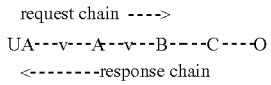

Not all responses are cacheable, and some requests may contain modifiers which place special requirements on cache behavior. Some HTTP/1.0 applications use heuristics to describe what is or is not a "cacheable" response, but these rules are not standardized.

On the Internet, HTTP communication generally takes place over TCP/IP connections. The default port is TCP 80, but other ports can be used. This does not preclude HTTP from being implemented on top of any other protocol on the Internet, or on other networks. HTTP only presumes a reliable transport; any protocol that provides such guarantees can be used, and the mapping of the HTTP/1.0 request and response structures onto the transport data units of the protocol in question is outside the scope of this specification.

Except for experimental applications, current practice requires that the connection be established by the client prior to each request and closed by the server after sending the response. Both clients and servers should be aware that either party may close the connection prematurely, due to user action, automated time-out, or program failure, and should handle such closing in a predictable fashion. In any case, the closing of the connection by either or both parties always terminates the current request, regardless of its status.

Uniform Resource Identifiers

URIs have been known by many names: WWW addresses, Universal Document Identifiers, Universal Resource Identifiers, and finally the combination of Uniform Resource Locators (URL) and Names (URN). As far as HTTP is concerned, Uniform Resource Identifiers are simply formatted strings which identify—via name, location, or any other characteristic—a network resource.

URIs in HTTP can be represented in absolute form or relative to some known base URI, depending upon the context of their use. The two forms are differentiated by the fact that absolute URIs always begin with a scheme name followed by a colon.

URI=(absoluteURI|relativeURI) ["#" fragment]
    absoluteURI=scheme ":"*(uchar|reserved)
    relativeURI=net_path|abs_path|rel_path

HTTP URL

The "http" scheme is used to locate network resources via the HTTP protocol. This section defines the scheme-specific syntax and semantics for http URLs.

http_URL="http:" "//" host [":" port] [abs_path]
    host=<A legal Internet host domain name or IP address (in dotted-decimal form), as defined by Section 2.1 of RFC 1123>
    port=*DIGIT If the port is empty or not given, port 80 is assumed. The semantics are that the identified resource is located at the server listening for TCP connections on that port of that host, and the Request-URI for the resource is abs_path. If the abs_path is not present in the URL, it must be given as "/" when used as a Request-URI (RFC 1945 Section 5.1.2).

Note: Although the HTTP protocol is independent of the transport layer protocol, the http URL only identifies resources by their TCP location, and thus non-TCP resources must be identified by some other URI scheme.

The canonical form for "http" URLs is obtained by converting any UPALPHA characters in host to their LOALPHA equivalent (hostnames are case-insensitive), eliding the [":" port] if the port is 80, and replacing an empty abs_path with "/".

Message Types

HTTP messages consist of requests from client to server and responses from server to client.

HTTP-message=Simple-Request; HTTP/0.9 messages
    |Simple-Response
    |Full-Request; HTTP/1.0 messages
    |Full-Response Full-Request and Full-Response use the generic message format of RFC 822 for transferring entities. Both messages may include optional header fields (also known as "headers") and an entity body. The entity body is separated from the headers by a null line (i.e., a line with nothing preceding the CRLF).

Full-Request=Request-Line
    *(General-Header
    |Request-Header
    |Entity-Header)
    CRLF
    [Entity-Body]
    Full-Response=Status-Line
    *(General-Header
    |Response-Header
    |Entity-Header)
    CRLF
    [Entity-Body]

Simple-Request and Simple-Response do not allow the use of any header information and are limited to a single request method (GET).

Simple-Request="GET" SP Request-URI CRLF
    Simple-Response=[Entity-Body]

Use of the Simple-Request format is discouraged because it prevents the server from identifying the media type of the returned entity.

A request message from a client to a server includes, within the first line of that message, the method to be applied to the resource, the identifier of the resource, and the protocol version in use. For backwards compatibility with the more limited HTTP/0.9 protocol, there are two valid formats for an HTTP request:

Request=Simple-Request|Full-Request
    Simple-Request="GET" SP Request-URI CRLF
    Full-Request=Request-Line
    *(General-Header
    |Request-Header
    |Entity-Header)
    CRLF
    [Entity-Body]

Method

The Method token indicates the method to be performed on the resource identified by the Request-URI. The method is case-sensitive.

Method="GET"
    |"HEAD"
    |"POST"
    |extension-method
    extension-method=token The list of methods acceptable by a specific resource can change dynamically; the client is notified through the return code of the response if a method is not allowed on a resource. Servers should return the status code 501 (not implemented) if the method is unrecognized or not implemented.

The methods commonly used by HTTP/1.0 applications are fully defined in RFC 1945 Section 8.

Request-URI

The Request-URI is a Uniform Resource Identifier (RFC 1945 Section 3.2) and identifies the resource upon which to apply the request.

Request-URI=absoluteURI|abs_path

The two options for Request-URI are dependent on the nature of the request.

The absoluteURI form is only allowed when the request is being made to a proxy. The proxy is requested to forward the request and return the response. If the request is GET or HEAD and a prior response is cached, the proxy may use the cached message if it passes any restrictions in the Expires header field. Note that the proxy may forward the request on to another proxy or directly to the server specified by the absoluteURI. In order to avoid request loops, a proxy must be able to recognize all of its server names, including any aliases, local variations, and the numeric IP address. An example Request-Line would be:

GET http://www.w3.org/pub/WWW/TheProject.html HTTP/1.0

The most common form of Request-URI is that used to identify a resource on an origin server or gateway. In this case, only the absolute path of the URI is transmitted (see RFC 1945 Section 3.2.1, abs_path). For example, a client wishing to retrieve the resource above directly from the origin server would create a TCP connection to port 80 of the host "www.w3.org" and send the line:

GET /pub/WWW/TheProject.html HTTP/1.0 followed by the remainder of the Full-Request. Note that the absolute path cannot be empty; if none is present in the original URI, it must be given as "/" (the server root).

The Request-URI is transmitted as an encoded string, where some characters may be escaped using the "% HEX HEX" encoding defined by RFC 1738. The origin server must decode the Request-URI in order to properly interpret the request.

Request Header Fields

The request header fields allow the client to pass additional information about the request, and about the client itself, to the server. These fields act as request modifiers, with semantics equivalent to the parameters on a programming language method (procedure) invocation.

Request-Header=Authorization
|From
|If-Modified-Since
|Referer
|User-Agent

Request-Header field names can be extended reliably only in combination with a change in the protocol version. However, new or experimental header fields may be given the semantics of request header fields if all parties in the communication recognize them to be request header fields. Unrecognized header fields are treated as Entity-Header fields.

Response

After receiving and interpreting a request message, a server responds in the form of an HTTP response message.

Response=Simple-Response|Full-Response
Simple-Response=[Entity-Body]
Full-Response=Status-Line
*(General-Header
|Response-Header
|Entity-Header)
CRLF
[Entity-Body]

A Simple-Response should only be sent in response to an HTTP/0.9 Simple-Request or if the server only supports the more limited HTTP/0.9 protocol. If a client sends an HTTP/1.0 Full-Request and receives a response that does not begin with a Status-Line, it should assume that the response is a Simple-Response and parse it accordingly. Note that the Simple-Response consists only of the entity body and is terminated by the server closing the connection.

Status-Line

The first line of a Full-Response message is the Status-Line, consisting of the is protocol version followed by a numeric status code and its associated textual phrase, with each element separated by SP characters.

Status Code and Reason Phrase

The Status-Code element is a 3-digit integer result code of the attempt to understand and satisfy the request. The Reason-Phrase is intended to give a short textual description of the Status-Code. The Status-Code is intended for use by automata and the Reason-Phrase is intended for the human user. The client is not required to examine or display the Reason-Phrase.

The first digit of the Status-Code defines the class of response. The last two digits do not have any categorization role. There are 5 values for the first digit:

1xx: Informational—Not used, but reserved for future use

2xx: Success—The action was successfully received, understood, and accepted.

3xx: Redirection—Further action must be taken in order to complete the request

4xx: Client Error—The request contains bad syntax or cannot be fulfilled

5xx: Server Error—The server failed to fulfill an apparently valid request

The individual values of the numeric status codes defined for HTTP/1.0, and an example set of corresponding Reason-Phrase's, are presented below. The reason phrases listed here are only recommended—they may be replaced by local equivalents without affecting the protocol. These codes are fully defined in RFC 1945 Section 9.

Status-Code="200"; OK
|"201"; Created
|"202"; Accepted
|"204"; No Content
|"301"; Moved Permanently
|"302"; Moved Temporarily
|"304"; Not Modified
|"400"; Bad Request
|"401"; Unauthorized
|"403"; Forbidden
|"404"; Not Found
|"500"; Internal Server Error
|"501"; Not Implemented
|"502"; Bad Gateway
|"503"; Service Unavailable
|extension-code
extension-code=3DIGIT
Reason-Phrase=*<TEXT, excluding CR, LF>

HTTP status codes are extensible, but the above codes are the only ones generally recognized in current practice. HTTP applications are not required to understand the meaning of all registered status codes, though such understanding is obviously desirable. However, applications must understand the class of any status code, as indicated by the first digit, and treat any unrecognized response as being equivalent to the x00 status code of that class, with the exception that an unrecognized response must not be cached. For example, if an unrecognized status code of 431 is received by the client, it can safely assume that there was something wrong with its request and treat the response as if it had received a 400 status code. In such cases, user agents should present to the user the entity returned with the response, since that entity is likely to include human-readable information which will explain the unusual status.

Response Header Fields

The response header fields allow the server to pass additional information about the response which cannot be placed in the Status-Line. These header fields give information about the server and about further access to the resource identified by the Request-URI.

Response-Header=Location
|Server
|WWW-Authenticate

Response-Header field names can be extended reliably only in combination with a change in the protocol version. However, new or experimental header fields may be given the semantics of response header fields if all parties in the communication recognize them to be response header fields. Unrecognized header fields are treated as Entity-Header fields.

GET

The GET method means retrieve whatever information (in the form of an entity) is identified by the Request-URI. If the Request-URI refers to a data-producing process, it is the produced data which shall be returned as the entity in the response and not the source text of the process, unless that text happens to be the output of the process.

The semantics of the GET method changes to a "conditional GET" if the request message includes an If-Modified-Since header field. A conditional GET method requests that the identified resource be transferred only if it has been modified since the date given by the If-Modified-Since header, as described in RFC 1945 Section 10.9. The conditional GET method is intended to reduce network usage by allowing cached entities to be refreshed without requiring multiple requests or transferring unnecessary data.

HEAD

The HEAD method is identical to GET except that the server must not return any Entity-Body in the response. The meta-information contained in the HTTP headers in response to a HEAD request should be identical to the information sent in response to a GET request. This method can be used for obtaining meta-information about the resource identified by the Request-URI without transferring the Entity-Body itself. This method is often used for testing hypertext links for validity, accessibility, and recent modification.

POST

The POST method is used to request that the destination server accept the entity enclosed in the request as a new subordinate of the resource identified by the Request-URI in the Request-Line. POST is designed to allow a uniform method to cover the following functions:

Annotation of existing resources;
Posting a message to a bulletin board, newsgroup, mailing list, or similar group of articles;
Providing a block of data, such as the result of submitting a form, to a data-handling process;
Extending a database through an append operation.

The actual function performed by the POST method is determined by the server and is usually dependent on the Request-URI. The posted entity is subordinate to that URI in the same way that a file is subordinate to a directory containing it, a news article is subordinate to a newsgroup to which it is posted, or a record is subordinate to a database.

Each Status-Code is described below, including a description of which method(s) it can follow and any metainformation required in the response.

Informational 1xx

This class of status code indicates a provisional response, consisting only of the Status-Line and optional headers, and is terminated by an empty line. HTTP/1.0 does not define any 1xx status codes and they are not a valid response to a HTTP/1.0 request.

Successful 2xx

This class of status code indicates that the client's request was successfully received, understood, and accepted.

200 OK

The request has succeeded. The information returned with the response is dependent on the method used in the request, as follows:

GET an entity corresponding to the requested resource is sent in the response;

HEAD the response must only contain the header information and no Entity-Body;

POST an entity describing or containing the result of the action.

201 Created

The request has been fulfilled and resulted in a new resource being created. The newly created resource can be referenced by the URI(s) returned in the entity of the response. The origin server should create the resource before using this Status-Code. If the action cannot be carried out immediately, the server must include in the response body a description of when the resource will be available; otherwise, the server should respond with 202 (accepted).

Of the methods defined by this specification, only POST can create a resource.

202 Accepted

The request has been accepted for processing, but the processing has not been completed. The request may or may not eventually be acted upon, as it may be disallowed when processing actually takes place. There is no facility for re-sending a status code from an asynchronous operation such as this.

The 202 response is intentionally non-committal. Its purpose is to allow a server to accept a request for some other process (perhaps a batch-oriented process that is only run once per day) without requiring that the user agent's connection to the server persist until the process is completed. The entity returned with this response should include an indication of the request's current status and either a pointer to a status monitor or some estimate of when the user can expect the request to be fulfilled.

204 No Content

The server has fulfilled the request but there is no new information to send back. If the client is a user agent, it should not change its document view from that which caused the request to be generated. This response is primarily intended to allow input for scripts or other actions to take place without causing a change to the user agent's active document view. The response may include new metainformation in the form of entity headers, which should apply to the document currently in the user agent's active view.

Redirection 3xx

This class of status code indicates that further action needs to be taken by the user agent in order to fulfill the request. The action required may be carried out by the user agent without interaction with the user if and only if the method used in the subsequent request is GET or HEAD. A user agent should never automatically redirect a request more than 5 times, since such redirections usually indicate an infinite loop.

300 Multiple Choices

This response code is not directly used by HTTP/1.0 applications, but serves as the default for interpreting the 3xx class of responses.

The requested resource is available at one or more locations. Unless it was a HEAD request, the response should include an entity containing a list of resource characteristics and locations from which the user or user agent can choose the one most appropriate. If the server has a preferred choice, it should include the URL in a Location field; user agents may use this field value for automatic redirection.

301 Moved Permanently

The requested resource has been assigned a new permanent URL and any future references to this resource should be done using that URL. Clients with link editing capabilities should automatically re-link references to the Request-URI to the new reference returned by the server, where possible.

The new URL must be given by the Location field in the response. Unless it was a HEAD request, the Entity-Body of the response should contain a short note with a hyperlink to the new URL.

If the 301 status code is received in response to a request using the POST method, the user agent must not automatically redirect the request unless it can be confirmed by the user, since this might change the conditions under which the request was issued.

302 Moved Temporarily

The requested resource resides temporarily under a different URL. Since the redirection may be altered on occasion, the client should continue to use the Request-URI for future requests. The URL must be given by the Location field in the response. Unless it was a HEAD request, the Entity-Body of the response should contain a short note with a hyperlink to the new URI(s).

If the 302 status code is received in response to a request using the POST method, the user agent must not automatically redirect the request unless it can be confirmed by the user, since this might change the conditions under which the request was issued.

304 Not Modified

If the client has performed a conditional GET request and access is allowed, but the document has not been modified since the date and time specified in the If-Modified-Since field, the server must respond with this status code and not send an Entity-Body to the client. Header fields contained in the response should only include information which is relevant to cache managers or which may have changed independently of the entity's Last-Modified date. Examples of relevant header fields include: Date, Server, and Expires. A cache should update its cached entity to reflect any new field values given in the 304 response.

Client Error 4xx

The 4xx class of status code is intended for cases in which the client seems to have erred. If the client has not completed the request when a 4xx code is received, it should immediately cease sending data to the server. Except when responding to a HEAD request, the server should include an entity containing an explanation of the error situation, and whether it is a temporary or permanent condition. These status codes are applicable to any request method.

Note: If the client is sending data, server implementations on TCP should be careful to ensure that the client acknowledges receipt of the packet(s) containing the response prior to closing the input connection. If the client continues sending data to the server after the close, the server's controller will send a reset packet to the client, which may erase the client's unacknowledged input buffers before they can be read and interpreted by the HTTP application.

400 Bad Request

The request could not be understood by the server due to malformed syntax. The client should not repeat the request without modifications.

401 Unauthorized

The request requires user authentication. The response must include a WWW-Authenticate header field (RFC 1945 Section 10.16) containing a challenge applicable to the requested resource. The client may repeat the request with a suitable Authorization header field (RFC 1945 Section 10.2). If the request already included Authorization credentials, then the 401 response indicates that authorization has been refused for those credentials. If the 401 response contains the same challenge as the prior response, and the user agent has already attempted authentication at least once, then the user should be presented the entity that was given in the response, since that entity may include relevant diagnostic information. HTTP access authentication is explained in Section 11.

403 Forbidden

The server understood the request, but is refusing to fulfill it. Authorization will not help and the request should not be repeated. If the request method was not HEAD and the server wishes to make public why the request has not been fulfilled, it should describe the reason for the refusal in the entity body. This status code is commonly used when the server does not wish to reveal exactly why the request has been refused, or when no other response is applicable.

404 Not Found

The server has not found anything matching the Request-URI. No indication is given of whether the condition is temporary or permanent. If the server does not wish to make this information available to the client, the status code 403 (forbidden) can be used instead.

Server Error 5xx

Response status codes beginning with the digit "5" indicate cases in which the server is aware that it has erred or is incapable of performing the request. If the client has not completed the request when a 5xx code is received, it should immediately cease sending data to the server. Except when responding to a HEAD request, the server should include an entity containing an explanation of the error situation, and whether it is a temporary or permanent condition. These response codes are applicable to any request method and there are no required header fields.

500 Internal Server Error

The server encountered an unexpected condition which prevented it from fulfilling the request.

501 Not Implemented

The server does not support the functionality required to fulfill the request. This is the appropriate response when the server does not recognize the request method and is not capable of supporting it for any resource.

502 Bad Gateway

The server, while acting as a gateway or proxy, received an invalid response from the upstream server it accessed in attempting to fulfill the request.

503 Service Unavailable

The server is currently unable to handle the request due to a temporary overloading or maintenance of the server. The implication is that this is a temporary condition which will be alleviated after some delay.

HTML

Numerous books describe HTML programming, including the book by Tim Evans entitled 10 *Minute Guide to HTML 3.2, Second Edition* published by Que, a Division of Macmillan Publishing with Copyright date of 1996, all disclosures of which are incorporated herein by reference. The following exemplary HTML file makes use of ordinary HTML programming concepts.

The following exemplary HTML file is to be stored as a file, and is to be used as input to a browser such as Netscape or Microsoft Explorer. The HTML file is stored on a server, and is transferred over a computer network to a client computer when a browser program running on the client computer makes a hyper transfer to the HTML file. Line x1<HTML> indicates to the browser the beginning of the HTML program. Line x2<head> indicates the beginning of the heading; <title> indicates the beginning of the title; "Web Index" is the title; </title> indicates the end of the title; </head> indicates the end of the heading. Line x2 commands the browser to place the words "Web Index" in the web page title position. Line x3<body> indicates the beginning of the body of the HTML program. Line x4<h1>WEB INDEX</h1> places the words Web index as the heading h1 in the display of the web page by the browser. Line x5<provides a line break after the title. Line x6 commands the browser to retrieve from the Web Site having the URL http://www.uspto.gov/ a file having the name "ptologo.gif"; "align="left" aligns the "dot gif" image presented by the file "ptologo.gif" to the left; and 'alt="[PTO Seal]" ' places the words "[PTO Seal]" in the Web Page displayed by the browser in the event that it is not possible to retrieve the file "ptologo.gif" from the Web Site. This URL is the address of the United States Patent and Trademark Office (USPTO) home page, and the file ptologo.gif, when presented by a browser, is the official seal of the USPTO. Line x7 places two line spacings to the next item displayed by the browser. Line x8 presents the words "USPTO Home Page" as highlighted, usually presented in a contrasting color and underlined, so that a user can click the mouse left button on the highlighted text to command the browser to make a hypertransfer to the Web Site identified by the text "www.uspto.gov, the URL of the USPTO home page. If the hyper-transfer is successfully executed, the browser then displays the USPTO home page. Clicking on any highlighted hyper link on the USPTO home page then commands the browser to transfer to a file indicated by the URL written into the HTML programming of the USPTO home page. Line x9</body> indicates to the browser the end of the body of the HTML program. Line x10</html> indicates to the browser the end of the HTML program.

x1. <html> x2. <head><title>Web Index</title></head> x3. <body> x4. <h1>WEB INDEX</h1> x5. <br> x6. <img src="http://www.uspto.gov/ptologo.gif" align="left" alt="[PTO Seal]"> x7. <br><br> x8. <a href=http://www.uspto.gov/>USPTO Home Page</a> x9. </body> x10. </html>

A point to note is that line x6, of the form <img src="URL/filename.gif> is automatically executed by the browser as it displays the web page defined by the HTML program, so that the browser automatically retrieves a file from a remote web site and displays the file as an image, assuming that the file is in an image format such as "dot gif", or jpeg, etc. Automatically retrieving a file in response to a line of HTML programming by the browser is referred to as "autoflow" execution. For example, autoflow execution uses the "src" attribute with an "img" tag.

The following alternative line of HTML programming:

<IMG SRC="http://www.foo.com/picture.gif" BORDER="0" WIDTH="468"

HEIGHT="60" ALT="Picture of Foo"> retrieves an image file "picture.gif" from the URL "http://www.foo.com/ and displays it with a width of 468 and a height of 60, where width and height are both measured in pixels as determined by the browser. Again, this image is retrieved by autoflow as the browser executes the HTML program file.

Turning now to FIG. 1, a computer network 100 having a client computer 102, a nearest network device 104, and a server 106 is shown. Network device 104 is located within network cloud 110. Client computer 102 connects by link 103 to network device 104. Network device 104 is typically a router (layer 3 device), a switch (layer 2, layer 3, or layer 4), etc. Server 106 connects to a network device (not shown) within network cloud 110. A World Wide Web (WWW) communications session is set up between the client 102 and the server 106. The user's browser program running on client computer 102 executes a command as follows:

http://<server>:<port>/<path>?<searchpart>

In this command the parts have the following meanings:

"http://" indicates the method of communication

"<server>:<port>" indicates the network, or TCP/IP address of the server along with the port of the server. With http the default port is port 80, that is if the <port> portion of the URL is omitted, the server defaults to port 80. Also the <server>:<port> part provides the TCP/IP network address information required to establish the TCP connection to the web server 106. The "<port>" part permits more than one server (software modules) to operate on one computer, as each software module is addressed by its "port number". One computer then provides multiple servers, each distinguished by its port number.

The text "<path>?<searchpart>" is an absolute address, usually a file address, in the server computer. This address is packaged in a message sent over the TCP/IP connection from the client computer to the server. The file at the address "<path>?<searchpart>" contains a resource desired by the client computer.

In accordance with the invention, a "reserved port" is designated for the client computer to communicate with the nearest network device 104. That is, a specific port number is designated as a "reserved port". Network device 104 always parses an http message for the port number, and when the network device finds the reserved port number, the network device intercepts the message and does not re-transmit the message.

When a network device encounters the <reserved-port> designation in a message, the network device replies to the client computer as though the network device were the server. Also, the network device responds to the "path>?<searchpart>" of the URL as a command. Action taken by the network device will depend upon the semantics chosen for this command structure.

In ordinary operation of the invention, the client computer application program, typically a browser, transmits a REQUEST message with a URL having a reserved port number. The browser learns the URL with the reserved port number as follows. The browser displays a first web page which the user is viewing. The displayed web page presents a hyperlink to a service which the user desires. The user executes the hyperlink, usually by placing a cursor on highlighted text of the hyperlink and clicking a button on his computer's "mouse".

Clicking the button on the mouse commands the browser program to transmit a REQUEST message to a second web page indicated by the hyperlink. The REQUEST message is addressed to the server computer holding the second web page. The server computer addressed by the REQUEST message receives the REQUEST message. In response to receiving the REQUEST message the server computer transmits a second web page to the user's computer, where the second web page is received by the user's is browser program which displays the second web page. The second web page has written into its HTML programming a command executed by "autoflow", and thereby automatically generates a second REQUEST message to the server computer. The second REQUEST message to the server computer is addressed by a URL containing a reserved port number.

For example, the URL may be written into the html of the second web page as:

<img src="URL/filename.gif WIDTH="0" HEIGHT="0">

The part "img src=" causes autoflow execution by the browser to send a REQUEST message to the URL to obtain an image of "filename.gif" with 0 width and 0 height.

The URL part is of the form:

URL=http://www.server_name.or :<reserved-port>/<path>?<searchpart>

The REQUEST message sent by the client computer to the URL with a <reserved-port> is a GET message requesting a TCP/IP connection as follows:

GET /<path>?<searchpart>HTTP/<http-version>

In response to discovering the <reserved-port>, the nearest network device 104 intercepts the REQUEST message. The network device 104 then replies to the client computer 102 in setting up the TCP/IP connection.

The network device 104 then interprets "path>?<searchpart>" as a command, attempts to execute the command, and returns an appropriate resource to the client computer based on the attempt to execute the command. For example, the network device 104 may return to the client computer 102 a web page textually describing the result status of executing the command by the network device.

Advantages of the invention include the following. By using a <reserved-port> for a client computer to communicate with a network device, it is possible to efficiently implement the invention in network devices. No change in client computer software is required for establishing communications between the client computer and the network device. Only a change in network device software, and a change in the relevant web pages from which the command is initiated, need to be made. Since there are millions of client computers, changes in client computer software are difficult to implement as it means millions of people purchasing new software. Thus the invention provides a much improved method for a client computer to communicate with a network device.

A further advantage to using a <reserved-port> for a client computer to communicate with a network device is that the URL, including the <reserved-port>, are parsed by the network device "packet classification" hardware device. For example, when the invention utilizes a connection such as a TCP/IP connection, the reserved port number is carried in the layer 4 header, and so the fast parsing structures in a network device filter out the packets having a reserved port number. The packet classification unit can then transfer the packet to a CPU within the network device for interpretation of the command string in the "path>?<searchpart>" portion of the URL for further processing. Thus the network device uses its fast filtering hardware to filter for the very infrequent packet carrying a reserved port number. Internal operation of network devices is described more fully with the aid of FIG. 5, FIG. 6, FIG. 7, and FIG. 8.

The network device 104 shown in FIG. 1 is the nearest network device to the client computer. However, the first network device which implements the invention in the path from the client computer to the server will parse the <reserved-port> indicator and intercept the message. This first network device to implement the invention will then interpret the GET message as a command, and respond appropriately to the client computer.

Figure 2:
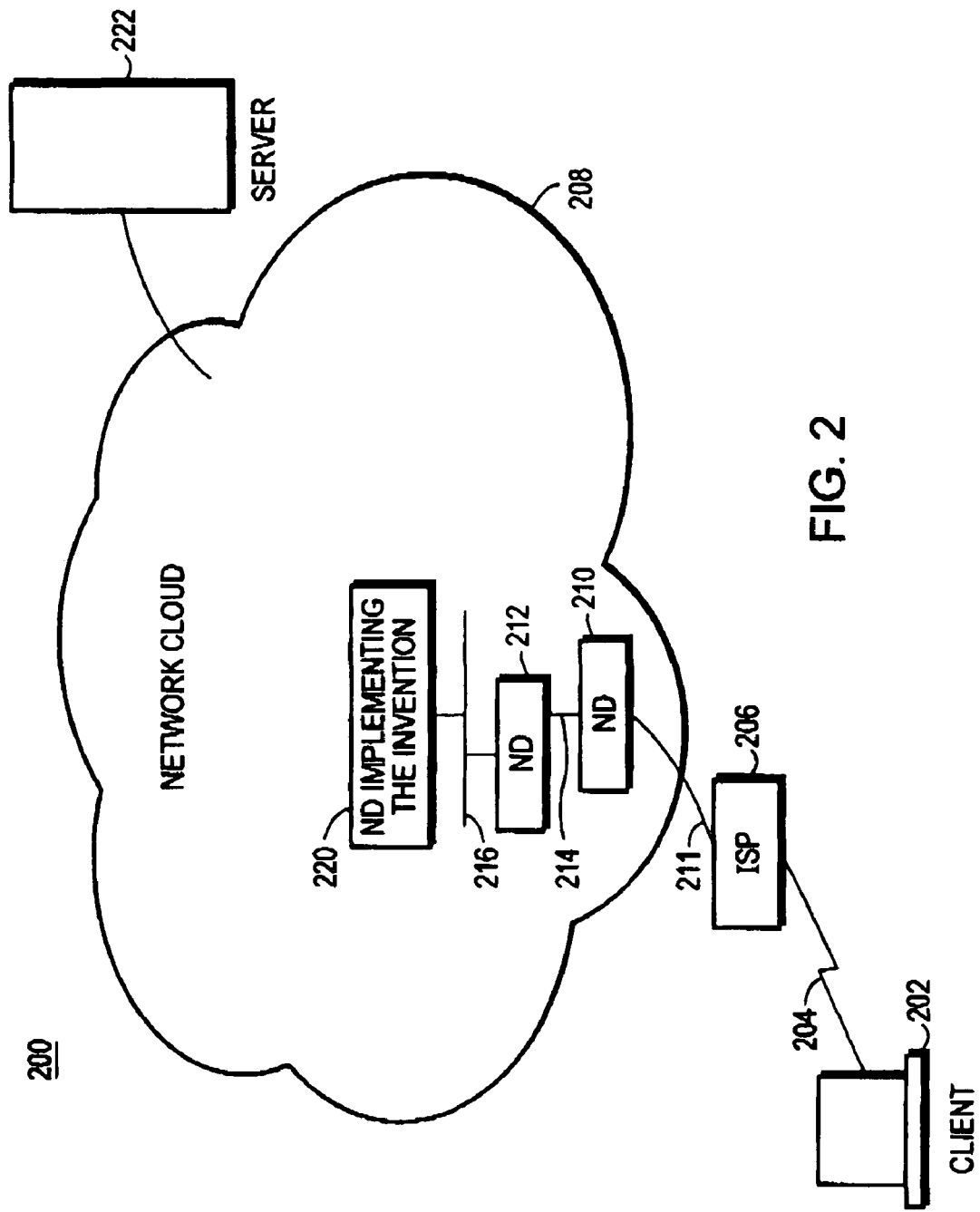
FIG. 2 is a block diagram of a computer network using the invention.

Turning now to FIG. 2, an exemplary network 200 with client computer 202 connected by a telephone link 204 to an Internet Service Provider (ISP) 206 is shown. ISP 206 connects to network cloud 208 by connecting to network device (ND) 210 through link 211. In turn, network device 210 connects to network device 212 through a direct link 214. Network device 212 connects to Ethernet LAN 216, and communicates with Network Device Implementing the Invention 220 through Ethernet LAN 216. In this exemplary computer network 200 the invention is not implemented in network device 210 nor network device 212. Network device 220 is the first network device implementing the invention in the communications path from client 202 to server 222. Accordingly, network device 220 parses the TCP/IP REQUEST message transmitted by client 202 to server 222, discovers the <reserved-port> designation, and therefore intercepts the REQUEST and returns a reply to the client 202. Then, the GET message transmitted by the client computer 202 in response to establishment of the TCP/IP connection between the client computer 202 and the network device 220, and having the form:

GET /<path>?<searchpart>HTTP/<http-version> is received by the network device 220 and is interpreted as a command.

Returning Status to Server

The invention provides a simple means for a network device to communicate with the web server. The network device can make use of a Status 302 message (described to hereinabove) to implement a redirected command by the client browser to the server 106 as shown in FIG. 1, or the server 222 as shown in FIG. 2. A status 302 is a "Moved Temporarily" message to a browser, and the message includes a new URL of a new address for the browser to contact for the requested resource. The network device can generate a Status 302 message redirecting the browser to the server, but without the <reserved-port> designation in the redirected message. The network device uses the IP address of the server in its Status 302 message, and it has access to the server IP address because it can read the server IP address from the Layer 3 Destination Address which it received in the first intercepted REQUEST message. This redirected message can carry the status of the network device after attempted execution of the command read from the first intercepted REQUEST message and GET message combination, and deliver the status to the server.

This Status 302 redirect HTTP protocol element can be applied and utilized in the invention as follows. Given a designated command URL, which was created by some web <server>:

http://<server>:<reserved-port>/<path>? (continued on next line)
CMD& {ARGx=<argx>&} RETURN=REDIR:<redirected-url> and the <redirected-url> is:

http://<server>/<unique-path>

If a network device intercepts the designated URL, it will execute the command indicated by:

CMD&{ARGx=<argx>} (i.e.: an arbitrary list of arguments)
The text:
RETURN=REDIR:<redirected-url> will then indicate that it has to return a redirected URL indication to the clients browser.

It will thus signal the 302 code and supply:
<redirected-url> and append <result-stat> indication, which is an encoding of the result of executing the command. The argument to the 302 code response message will thus be:

http://<server>/<unique-path>?<result-stat>

When the client browser gets this indication, it will immediately retrieve this new URL. By not being directed to any <reserved-port>, this new URL will actually reach the web server <server>. Through the <unique-path> component of the URL, the web server will know that this URL actually represents a return indication for the original designated command URL. The web server will also see the specific result information by means of the <result-stat> part of the URL which was supplied by the intercepting network device. As a response to this URL request, the web server can either return a image or web page resource that will display whatever the web server wants in place of the original designated command URL in the client browsers web page, or it can return yet another designated command URL to the clients browser, so that the clients browser will issue another command to the intercepting network device. In this way, chains of commands can be initiated by a web server to be indirectly originated by the clients browser towards a network device near the client computer.

It must be noted that this mechanism of using redirected URL to accomplish two tasks: first, to signal back return results from the network device to a web server; and secondly, to have the web server control the actual display of an embedded designated command URL in the clients browser, is not mandatory. Alternatively, it is possible to have the intercepting network device derive both goals in totally different manners (e.g.: additional protocols from the network device to the web server for example).

The redirect mechanism of this invention has the following advantages. The redirect mechanism keeps the required implementation complexity in the network device to a minimum while simultaneously achieving the maximum of flexibility in the web server's ability to control the network device.

Further, the network device does need to reply to a URL request. Instead of trying to source appropriate resources (images of web pages) from a network device, it is much more advantageous to have the freedom in the web server to do so. Also, this mechanism uses parts of a URL to transfer return status information from the network device to a server computer.

This redirect mechanism can also be used explicitly by any computer, be it client or server, in applications that understand this scheme. For example, instead of having a web browser request the URLs and redirected URLs, a simple application can simply use HTTP to send a designated command URL to its neighboring network device and explicitly interpret the resulting status of 302 and the associated <redirected-url> as the return status of that command.

First Exemplary Embodiment

Quality of Service

In a first exemplary embodiment of the invention, the network device is sent commands to set the quality of service (QOS) provided by the network device. The QOS may have several categories, where typical categories are "guaranteed delivery" of packets or "best effort" delivery. In guaranteed delivery the network device delivers the packets of the communications session before it delivers any best effort packets. Thus if there is congestion at the network device because of too much traffic on the network, packets from the guaranteed delivery session are delivered at the expense of packets on a best effort communications channel.

Best effort delivery of packets is typically used in transport of computer files. The files are divided into a number of packets, and if a packet is lost in the transfer the packet is retransmitted. The packets are numbered so that the receiving computer can determine if any packets are lost, and if so, request the retransmission by packet number. The transmitting computer retains a copy of a transmitted packet until it receives an acknowledgement message indicating that the packet has been received, so that it can retransmit the packet if it is not received. Retransmission is often controlled by a timer. With computer files, packets can arrive out of the order in which they were transmitted, they are simply sorted into proper order after arrival.

A typical use for guaranteed delivery of packets is in a voice connection such as a telephone call. For example, there could be a web page which two or more client computers access, the user "clicks" on an icon which initiates a telephone conversation between the clients by using a microphone and loudspeaker attached to the client computers, and the conversation is then carried by packets in a communications session between the client computers. Out of order arrival of the packets causes the real time voice communication to break up, and possibly become unintelligible. Since packet loss causes a real time voice conversation to break up, such a communications channel should have a QOS of "guaranteed packet delivery".

In order to set up the QOS of guaranteed delivery, the icon from the web page used to initiate the telephone conversation has, within the HTML programming in the web page displayed by the client computer, the text to initiate a REQUEST to a URL using the <reserved-port> designation of the invention. Thus, the nearest network device to the client computer which is enabled to intercept the REQUEST message then receives the command in the GET message written into the URL. The command tells the network device to establish guaranteed QOS for this communications session. The network device, in response to the command, takes two actions. First, the network device sets its parameters to establish guaranteed delivery for the communications session. Second, the network device transmits control messages to other network devices in the communications path of the communications session, commanding the other network devices to establish guaranteed delivery QOS. The network devices can send unicast messages to the next network device in the communications path established for the telephone call using ordinary routing tables, and they do so to establish guaranteed delivery QOS along the path. Thus by using the invention in the web page initiating the telephone call, each participating client computer can initiate a chain of control messages along the path of the telephone call to establish guaranteed delivery QOS.

Second Exemplary Embodiment

Source Specific Multicast

A second exemplary embodiment of the invention is in group multicast. Ordinarily in group multicast, the group number, or group IP address, of a multicast group is read by network devices participating in the multicast session. Ordinarily, the network devices maintain status of multicast groups, and so use that status to make forwarding decisions for packets in the multicast group. The status tells the network device to forward the multicast group to selected client computers, and not to forward the packet to other client computers, etc.

A problem with group multicast is that the network device does not make decisions based on the source station address in the multicast packet. Accordingly, a plurality of source stations may transmit packets with the same group IP address, and the network devices will forward all of the packets having the group IP address. This situation can have undesirable consequences, for example, a group session could be a television transmission with both picture and sound. A hostile client station may attempt to disrupt the multicast transmission by transmitting hacker packets masquerading as true multicast group packets. The hacker packets simply have the multicast group IP address in the proper field, and so are not distinguished by the network devices, and are simply zo forwarded by the network devices. The television transmission may then be interrupted by the hostile client computer transmitting hacker packets having the group IP address of the true television multicast group IP address. The problem with group multicast, at a minimum, is that the hacker may utilize network resources to deliver hacker packets into a group multicast session where the hacker packets are not wanted.

The invention supports restricting a network device to forward only packets having a multicast group number and a desired source address. The desired source address is the address of the client computer transmitting the true multicast group packets. The invention is used to command network devices to filter packets for the source address of the desired true source client computer.

For example, when a user of a client computer desires to receive multicast traffic from a specific source, the user displays a web page providing access to the multicast group. The user places his cursor on an icon displayed by the web page, clicks his mouse button, and initiates a hyper transfer to the URL written into the web page HTML programming. The hyper transfer to the URL written into the web page HTML programming causes a second web page to be transferred to the user. The second web page contains an autoflow (for example, using the "src" attribute) command to a URL containing the reserved port number, and the user's client computer then transmits a REQUEST message to the URL. The URL contains the <reserved-port> number, the network device intercepts the REQUEST message from the client computer requesting establishment of the TCP/IP connection in response to parsing the REQUEST message and finding the <reserved-port> designation. The network device then intercepts the GET message and reads the command. The command in this exemplary embodiment of the invention requires the network device to forward only those multicast group packets having a desired source client computer source address. For example, a typical URL having the command could have the following form.

On the web server, where the second web page is stored, the IP address of the actual sender source computer, from which the client computer wants to receive multicast packets, is known. The HTML programming in the autoflow command of the second web page transferred to the client computer, in response to the user clicking his mouse button on a hyperlink in the first web page, includes the URL of the invention, for example:

http://<server>:<reserved-port>/<path>? (continued on next line)
SINGLE_SOURCE MCAST&GROUP=<group>&SOURCE=<sender> where specifically <group> is the IP address of the Multicast Group in question and <sender> is the IP address of the sender client computer sending the true multicast group packets. The text "SINGLE_SOURCE_MCAST&GROUP" commands the network device to forward only those packets having both the group IP address found in <group> and the source computer having the IP address found in <sender>.

The web server can then use a redirected message to receive status from the network device, and so learn the result of the attempt by the network device to execute the command.

Figure 3:
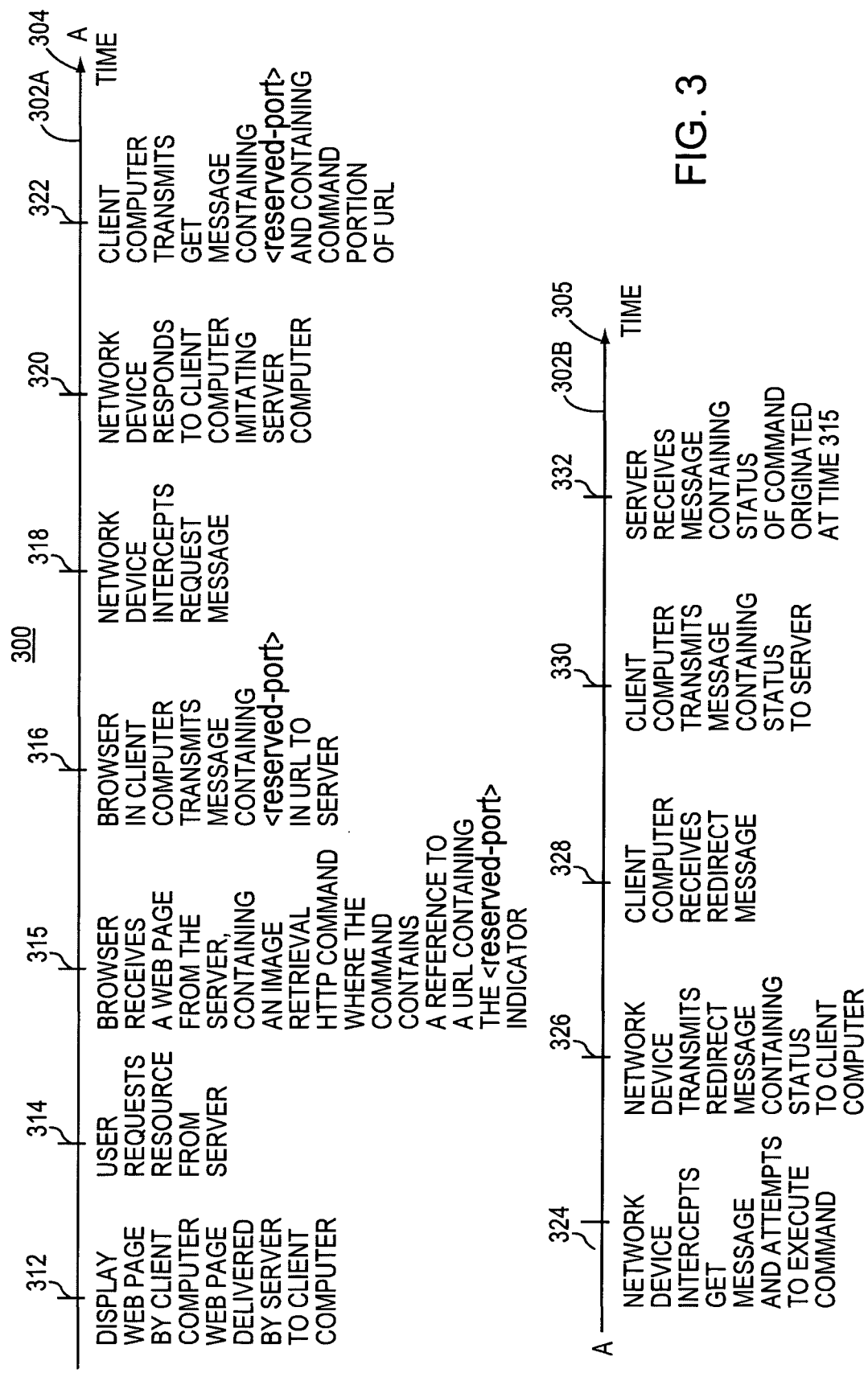
FIG. 3 is a time line of events in accordance with the invention.

Turning now to FIG. 3, a time line 300 for operation of the invention is shown. Time line 303 is broken into two parts, 302A and 302B in order to fit it onto the page. Time line 302A at point A joins time line 302B at point A'. Time line 302A-302B has various events marked, and time increases in the direction of arrow 304 and arrow 305.

At time 312 the client computer displays a web page which was delivered as a HTML file by the server to the client computer. At time 314 a user of the client computer requests a resource from the server, usually by placing the cursor of the client computer over an icon on the web page and clicking the left mouse button. At time 315 the browser receives from the server, in response to the request of time 314, a web page containing an image retrieval HTML command. The image retrieval HTML command is executed automatically by the browser, for example a <img src=URL>HTML command is executed by autoflow (for example, responding to the "src" attribute) by the browser. The URL in the image retrieval command contains the <reserved-port> designation. At time 316 the browser, in response to executing the image retrieval command received at time 315, transmits a REQUEST message containing the <reserved-port> indicator in a URL addressed to the server.

At time 318 the network device intercepts the message in response to parsing the URL carried in the message, and in response to discovering the <reserved-port> indicator. At time 320 the network device replies to the client computer as though it were the server, thereby establishing a TCP/IP connection between the client computer and the network device (even though the client computer thinks that it has established a TCP/IP connection with the server).

At time 322 the client computer transmits a GET message containing the Command portion of the URL transmitted at time 316, and also containing the <reserved-port> indicator so that the network device will intercept the GET message. At time 324 the network device intercepts the GET message in response to finding the <reserved-port> indicator in the GET message. Also at time 324 the network device attempts to execute the command found in the GET message.

At time 326 the network device transmits a redirect message (Status 302 message, Temporarily Moved message) with a redirect URL in a field of the redirect message, the redirect URL having the address of the server and omitting the <reserved-port> indicator. At time 328 the client computer receives the redirect message. At time 330 the client computer transmits a message using the redirect URL to the server, the message containing status of the network device in its attempt to execute the command found in the GET message received at time 324. At time 332 the server receives the redirected message transmitted at time 330, as this message is not intercepted by the network device because it does not contain the <reserved-port> indicator.

Figure 4:
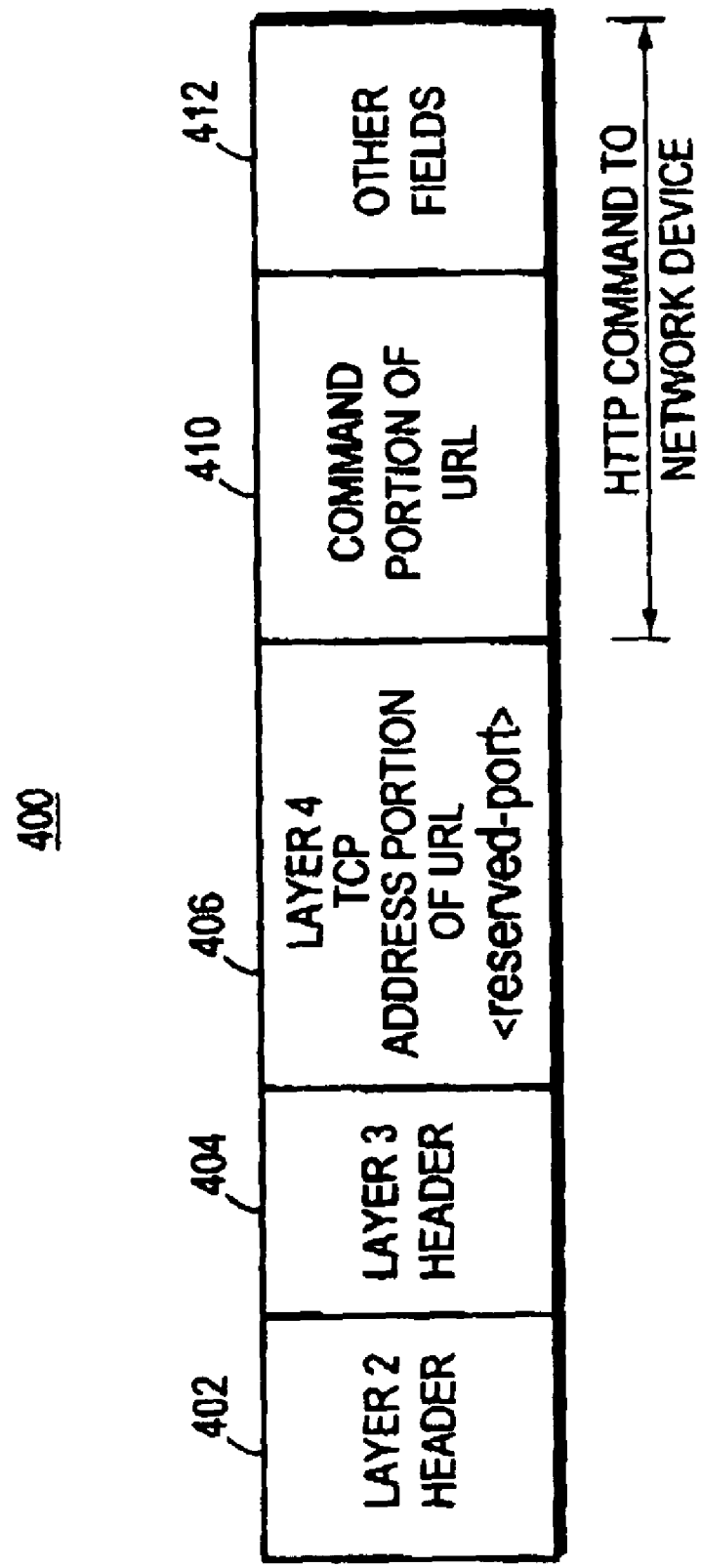
FIG. 4 is a bock diagram of a typical data packet.

Turning now to FIG. 4, a typical data packet 400 is shown. The layer 2 (L2) fields are in layer 2 header 402 and contain the MAC destination address, the MAC source address, and possibly other fields, depending upon the local area network (LAN) protocol. The layer 3 (L3) header 404 contains the layer 3 fields including the IP destination address, the IP source address, and possibly other fields. Fields 406 contain the layer 4 (L4) fields, for example the TCP/IP fields which contain the reserved port number and other fields from the URL needed for addressing the packet. Fields 410 contain commands to network devices, and may contain a plurality of fields.

The network device high speed packet classification unit parses fields 406, finds the <reserved-port> indicator. The network device then responds according to the invention. Other fields may be carried in the packet 400, and they are indicated schematically by field 412.

Figure 4A:
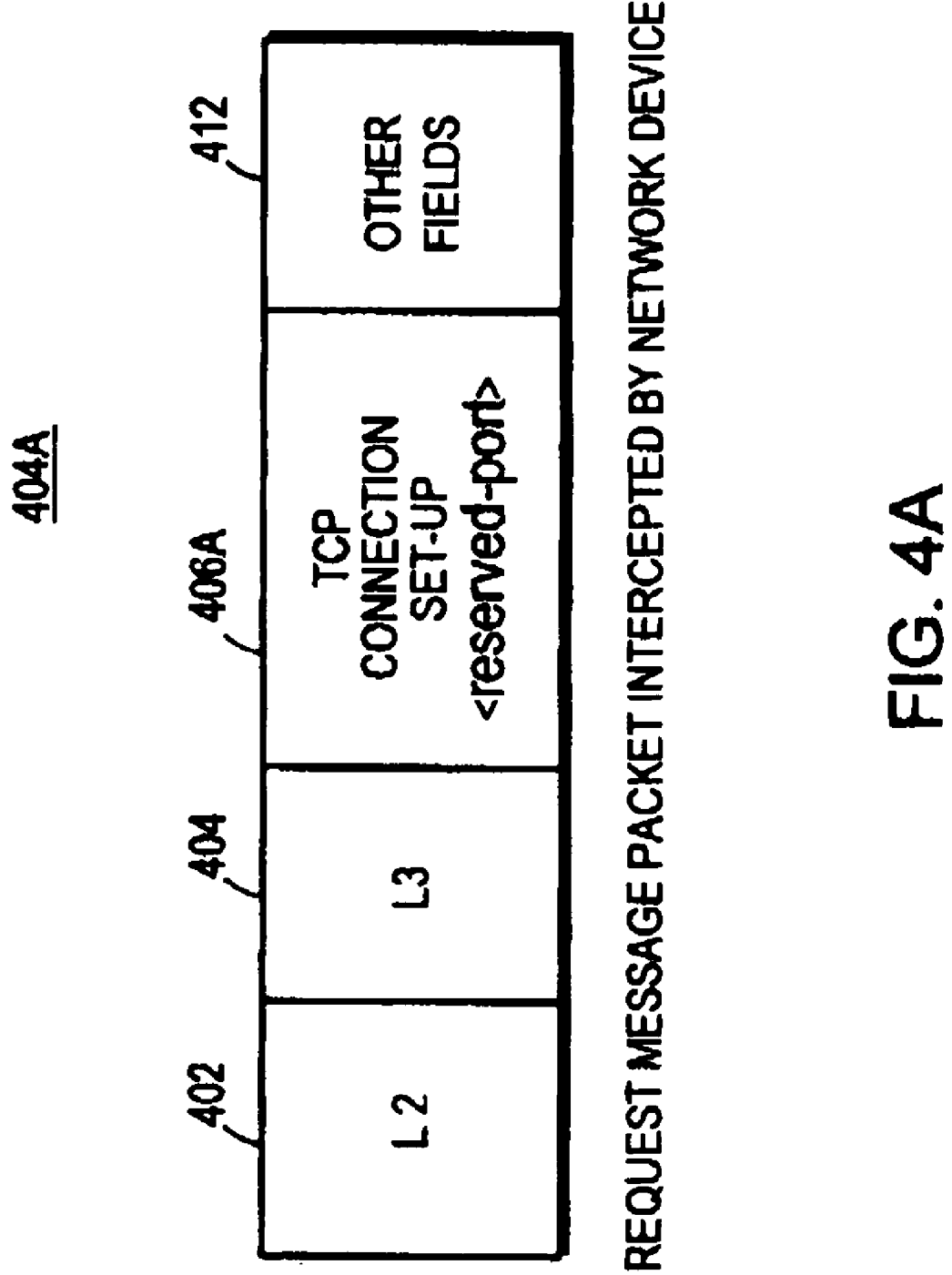
FIG. 4A is a field diagram of a REQUEST message.

Turning now to FIG. 4A, a REQUEST message packet requesting a TCP/IP connection setup, in accordance with the invention, is shown with the reserved port number carried in layer 4 field 406A. A REQUEST message as shown in FIG. 4A is transmitted by the users client computer at time 316.

Before the network device replies to the client computer at time 320, the network device must reconstruct the URL including the reserved port number. The next message transmitted by the client computer in this conversation will then contain the URL having the reserved port number, and also will contain a command string "<path>?<search path>" to be returned to the network device as a further command to the network device.

Figure 4B:
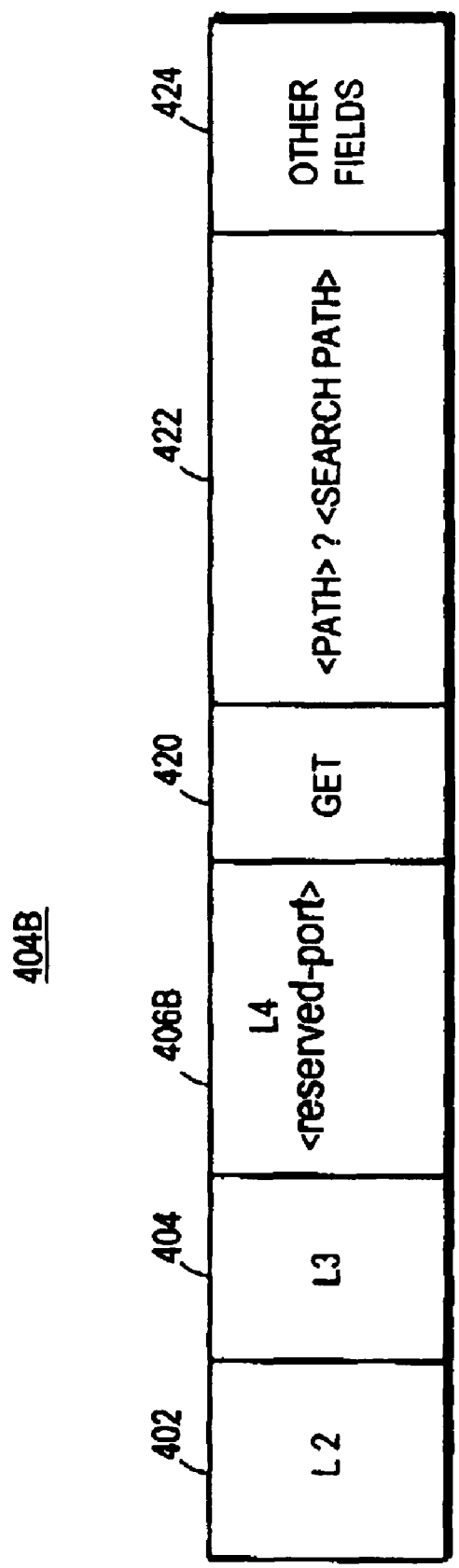
FIG. 4B is a field diagram of a GET message.

Turning now to FIG. 4B, a GET message packet in accordance with the invention, and with the reserved port number in layer 4 field 406B, is shown. Field 422 contains the <path>?<search path> of the URL, and serves as a command to the intercepting network device. Fields 424 contain other fields of packet 404B.

A sequence of messages may be interchanged between the client computer and the network device, with the client computer believing that it is sending and receiving messages with the server computer.

Figure 5:
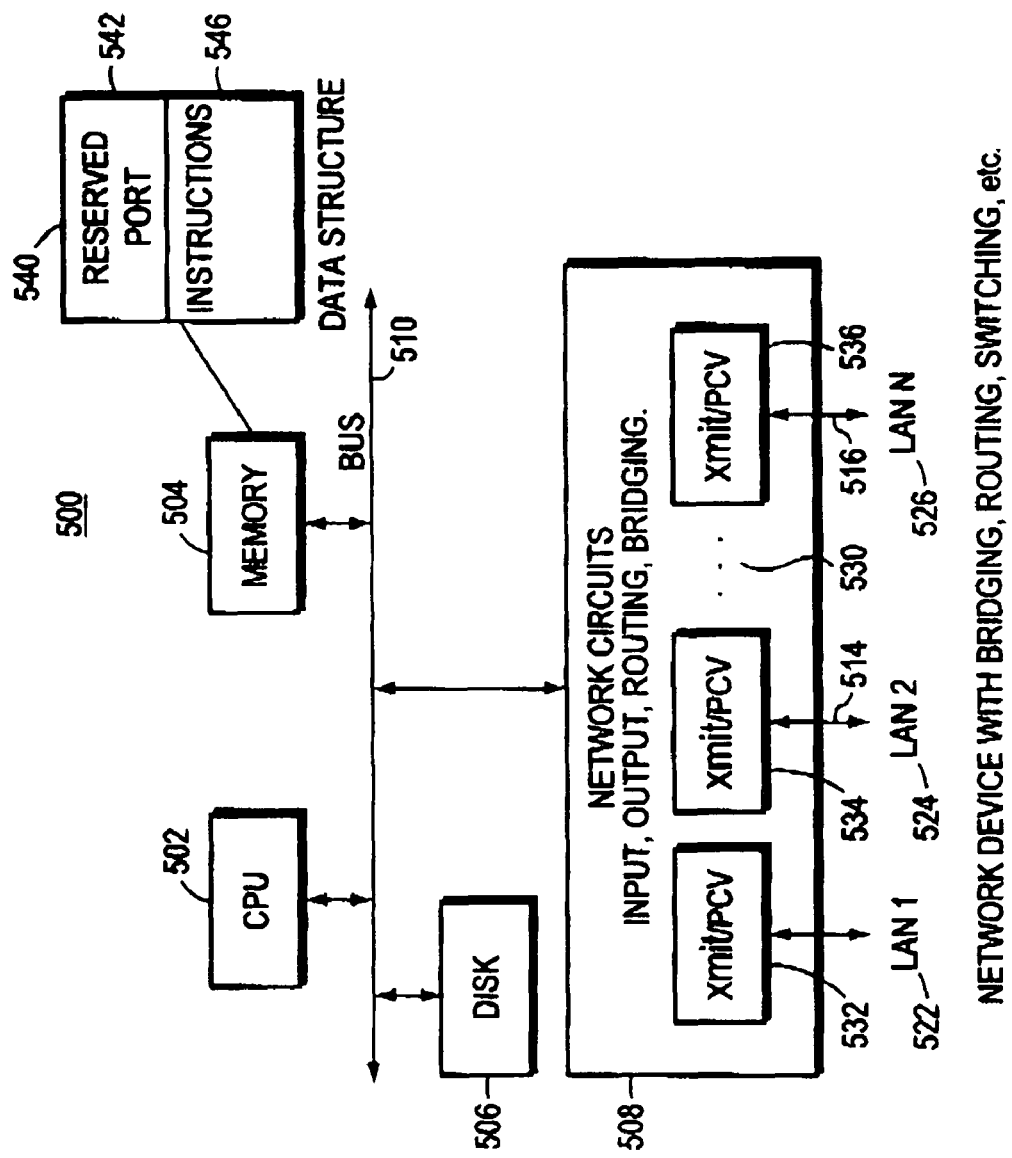
FIG. 5 is a block diagram of a network device.

Turning now to FIG. 5, a block diagram of a typical network device 500 is shown. For example, network device 500 could be a router operating at layer 4, a bridge operating at layer 2, or a switch operating at any layer, including a layer 4 switch, etc. Implementation of the invention is normally done with a router or layer 4 switch, so that the packet classification unit of the network device can execute rapid filtering of the incoming packets, and be sensitive to the reserved port number carried in the layer 4 header.

In an alternative embodiment of the invention, fields in a lower layer could be defined to signal to the network device. For example, a SNAP SAP optional set of fields could be defined to implement a client computer signaling to a network device.

Central processor unit (CPU) 502 manages operation of the network device. Memory 504 holds data structures, data, and instructions useful to operation of network is device 500. Memory 504 may be any type of electronic memory, Random Access Memory (RAM), Read Only Memory (ROM), etc. Disk 506 is an internal disk drive to facilitate operation of network device 500. Disk 506 is optional, and many designs of network devices do not use an internal disk drive 506.

For example, the various tables used by network device 500 may be stored on disk 506. That is, the three tables: first, the locally reachable bridge table which the bridge (or network device) uses to bridge using Layer 2 frame information from one of its ports to another port, and which is used when an incoming packet has in its Layer 2 destination address an address other than the Layer 2 address of the network device; second, a remotely reachable table which a peer network device uses to determine which peer network device it should forward an incoming frame to as an extension of its bridging function, such as use of DLSw routing protocol for a frame having a Layer 2 destination address different from the Layer 2 address of the network device; and third, a routing table which the network device uses for ordinary Layer 3 routing functions and which is used when an incoming packet has in its Layer 2 destination address the Layer 2 address of the network device, may all be stored on disk 506. Also layer 4 switching tables may be stored to disk 506. Alternatively, the tables may be maintained in memory 504 in the event that no disk drive is used in the network device. In any event, the tables will be in memory 504 for use by the various bridging and routing functions of network device 500

Network circuit 508 contains the major bridging and routing circuits of network device 500. Bus 510 connects the CPU 502, Memory 504, Disk (if any) 506, and network circuits 508 together so that they can exchange information by use of typical bus protocols.

Network circuit 508 contains the circuits responsible for input from local area networks (LANs), output to LANs, circuits for bridging of data packets, and circuits for performing routing, and possibly memory circuits to facilitate fast switching, etc. Switching is a general term used for fast transfer of packets from an input LAN to an output LAN. Particularly, bridging of packets using only Layer 2 constructs, is accomplished by network circuit 508. Each port 512, 514, 516 of network device 500 connects to a different local area network (LAN). For example, port 512 connects to a LAN designated as LAN1 522. Port 514 connects to LAN2 524.

There may be a large number of ports, and the highest numbered port is represented as port N 516, where LAN N 526 is shown connected to port N 516. The three dots 530 indicate that network circuits 508 may serve many network device ports. Each port is connected to its transmitter and receiver. As an example, one or more of the ports 512, 516, etc. may connect the network device to a TCP/IP network cloud.

Transmitter and receiver circuit Xmit/RCV 532 serves port 512 and LAN 1 522. Xmit/RCV circuit 534 serves port 514 and LAN 2 524. There is a transmit and receive circuit for each LAN, and so correspondingly Xmit/RCV circuit 536 serves port N 516 and LAN N 526.

The layers of the Internet Protocol communications model are implemented in various convenient hardware elements as shown in the block diagram of a network device of FIG. 5. The Internet Communications model is described by Andrew Tanenbaum in his book *Computer Networks, Third Edition* published by Prentice Hall publishing company Copyright 1996, all disclosures of which are incorporated herein by reference, especially at pages 35-38. For example, depending upon the design of the network device, Layer 1 and Layer 2 may be implemented in hardware in the circuits of network circuits 508. Alternatively, field parsing and recognition functions may be implemented in software which executes on CPU 502 in connection with memory 504. Higher layer functions such as Layer 3 Network, or Layer 4 Transport, may be implemented in software executing on CPU 502. Layer 4 reliable transport implemented in the transport is layer is usually implemented in software executing in CPU 502, although even Layer 4 functions may be implemented in hardware by using an ASIC semiconductor chip.

Network device 500 may alternatively, be referred to as a bridge with a DLSw Layer 3 port, or as an alternative network device 500 may be referred to as a router, or as a still further alternative network device 500 may be referred to as a "switch". The acronym "DLSw" stands for Data Link Switch. The term "switch" often refers to internal operation of the hardware. A switch may operate in Layer 2, Layer 3, or in layer 4. Alternatively, in hardware having network device functionality such as a router or bridge, the module may function internally as a hardware switch. Operations requiring both bridge module and router module operation may function as a software switch, and may use function calls between the different modules. And the internal forwarding structure may be a switch, and both bridge and router modules execute in CPU 502. A switched LAN is described by Andrew Tanenbaum in his book Computer Networks, Third Edition, published by Prentice Hall, Copyright date 1996, all disclosures of which are incorporated herein by reference, particularly pages 285-287.

Data structure 540 is, for example, stored in memory 540. Data structure 540 has field 542 which contains a representation of the <reserved-port> indicator used by the invention. Field 546 contains instructions to be executed by CPU 502 in order for network device 500 to practice the invention as described hereinabove. The invention is implemented, primarily, in a network device such as the exemplary network device 500, and the instructions to implement the network device part of the invention are stored in to data structure 540 in field 546.

Alternatively, the instruction field 546 of data structure 540 may be stored on disk 506 in order to conserve memory space. REQUEST, GET, etc. messages are parsed by the network circuits 508 as they look for the <reserved-port> indicator stored in field 542. In the event that a REQUEST message is found to have the <reserved-port> indicator in field 410 as shown in FIG. 4, then the instructions are read off the disk and stored in field 546 of data structure 540 in preparation for executing the instructions by CPU 502.

Figure 6:
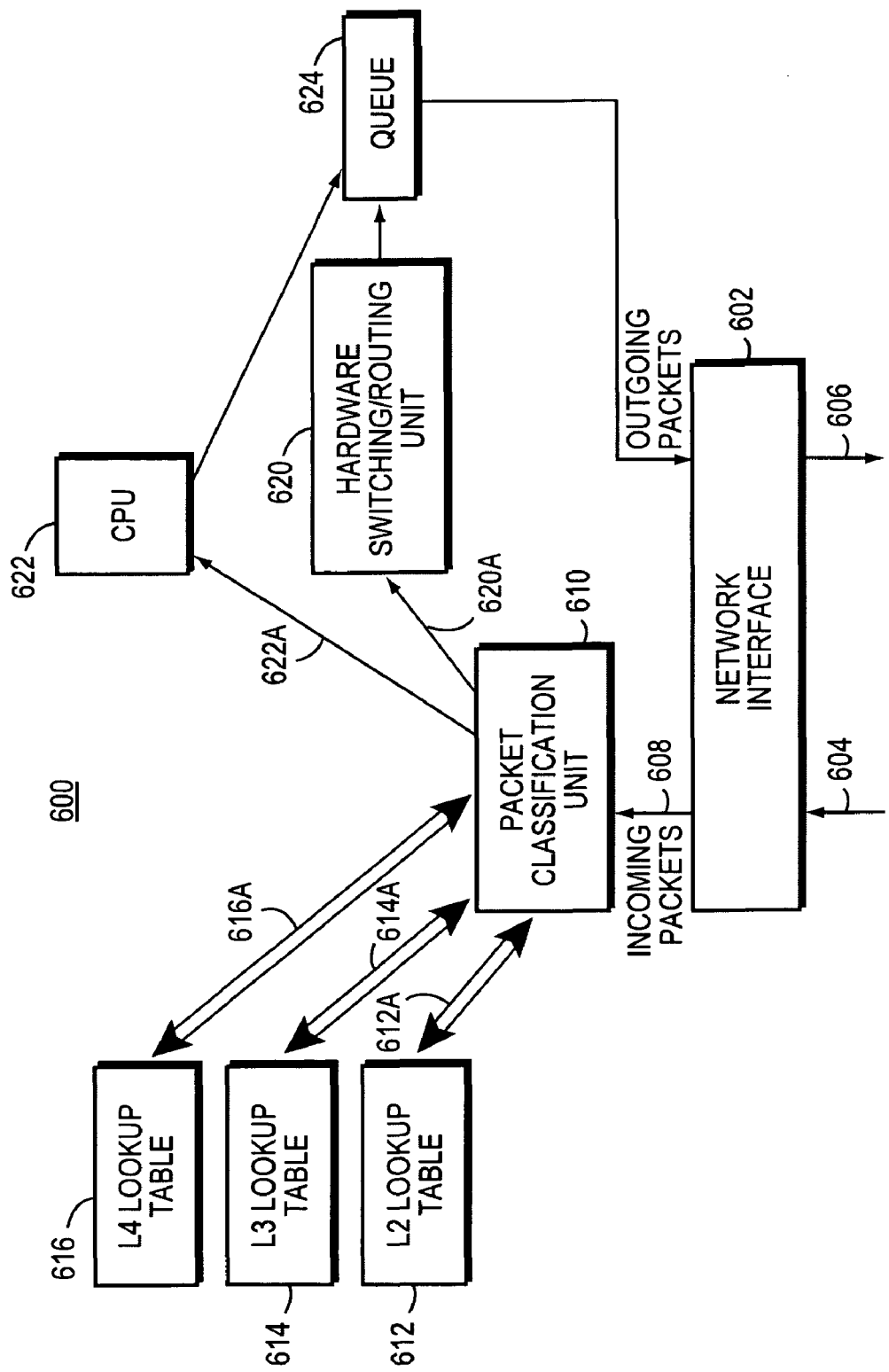
FIG. 6 is a logic diagram of a network device.

Turning now to FIG. 6, a logic diagram 600 for a network device is shown. Network interface 602 receives packets from the network along path 604. Network interface 602 also transmits packets to the network along path 606.

When an incoming packet is detected as arriving along path 604 it is transferred along path 608 to packet classification unit 610. Packet classification unit 610 operates fast, and usually it is implemented in hardware in order to achieve high speed. Alternatively, packet classification unit 610 may be implemented in optimized software running in a dedicated processor. Packet classification unit 610 interprets the fields of layer 2 header 402 by exchanging data with L2 lookup table 612 through path 612A. Also, packet classification unit 610 interprets fields of layer 3 header 404 by exchanging data with L3 lookup table 614 through path 614A. Further, packet classification unit 610 interprets fields of layer 4 header 406, 406A, 406B, etc. by exchanging information with L4 lookup table 616 through path 616A. Classification unit 610 makes a decision, based upon interpreting the various fields of layer 2, layer 3, and layer 4, and either transfers the packet to hardware switching/routing unit 620 through path 620A for immediate retransmission, or transfers the packet to CPU 622 through path 622A for further interpretation of fields of the packet. Both hardware switching unit 620 and CPU 622 transfer packets to queue 624 for retransmission onto the network by network interface 602 through path 606.

Under present day terminology, a network device having a packet classification unit which can interpret a layer 4 header is referred to as a layer 4 switch or router. A layer 4 switch or router can implement the invention because the URL is carried in the layer 4 header so that the "port" of the URL number is interpreted by packet classification unit 610. A packet which signals the network device through a field read by packet classification unit 610 is referred to as "efficient" implementation of the invention.

In a bridge, which has a packet classification unit operating only on layer 2 header 402, cannot efficiently implement the invention based on a URL to signal the network device. Likewise, a layer 3 switch packet classification unit only classifies on the basis of layer 2 and layer 3 headers, and so cannot efficiently implement the invention by using hardware parsing of the incoming packet which carries the URL reserved port number in layer 4. However, in the event that signaling of the network device is performed by defining reserved numbers in layer 2 header fields or layer 3 header fields, then the invention can be efficiently implemented in a bridge or layer 3 switch. However, it is difficult to obtain consent in a Standards Body to define new meanings for layer 2 fields and layer 3 fields, and so it is easier to implement the invention using a URL carried in a layer 4 field. However, a reserved field in a layer 2 header or in a layer 3 header could be parsed by the network device packet classification unit, and so in that case the invention could be implemented by signaling the network device by a reserved number carried in a layer 2 or layer 3 header field.

Alternatively, a network device which uses a packet classification unit which can interpret only a layer 2 header or a layer 3 header (such as a bridge or layer 3 switch) cannot implement the invention efficiently with the reserved port number carried by URL in a layer 4 field because such a network device must send all of the incoming packets to the CPU for interpretation, and such operation is inefficient because the CPU is slow in comparison with a hardware chip. A network device using the system CPU to implement the invention is referred to as "inefficient" implementation of the invention, because the CPU will reduce the rate at which the network device can handle incoming packets.

Various logic units shown in FIG. 6 may be physically implemented in network circuits 508, as shown in FIG. 5. For example, packet classification unit 610, the lookup tables L4 lookup table 616, L3 lookup table L3, and L2 lookup table 612, hardware switching unit 620, etc may all be implemented in hardware in network circuits 508. Implementation of these logic units in hardware permits the network device 500, that is the network device whose logic diagram 600 is shown in FIG. 6, to rapidly filter packets for all of the fields for which a lookup table is implemented.

Figure 7:
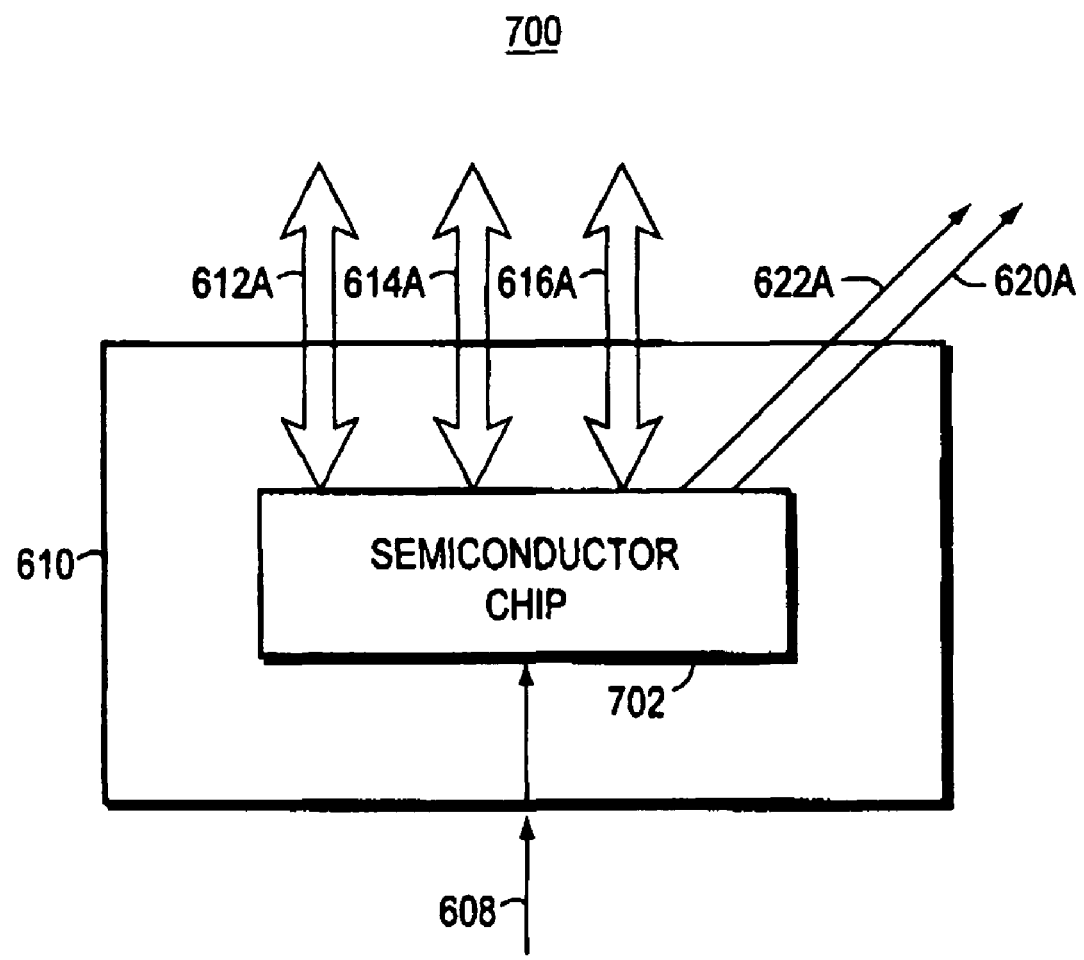
FIG. 7 is a block diagram of a packet classification unit implemented by a semiconductor is chip.

Packet classification unit 610 may be implemented as a single logic chip as shown in FIG. 7, for example, in an ASIC (Application Specific Integrated Circuit) chip. Alternatively, a special purpose chip may be designed to perform the functions of packet classification unit 610. Input path 608 delivers packets to semiconductor chip 702 from network interface 602. Semiconductor chip 702 uses paths as follows: path 612A to communicate with L2 lookup table 612; path 614A to communicate with L3 lookup table 614; path 616A to communicate with L4 lookup table 616; path 622A to communicate with CPU 622; and, path 620A to communicate with hardware switching unit 620.

Figure 8:
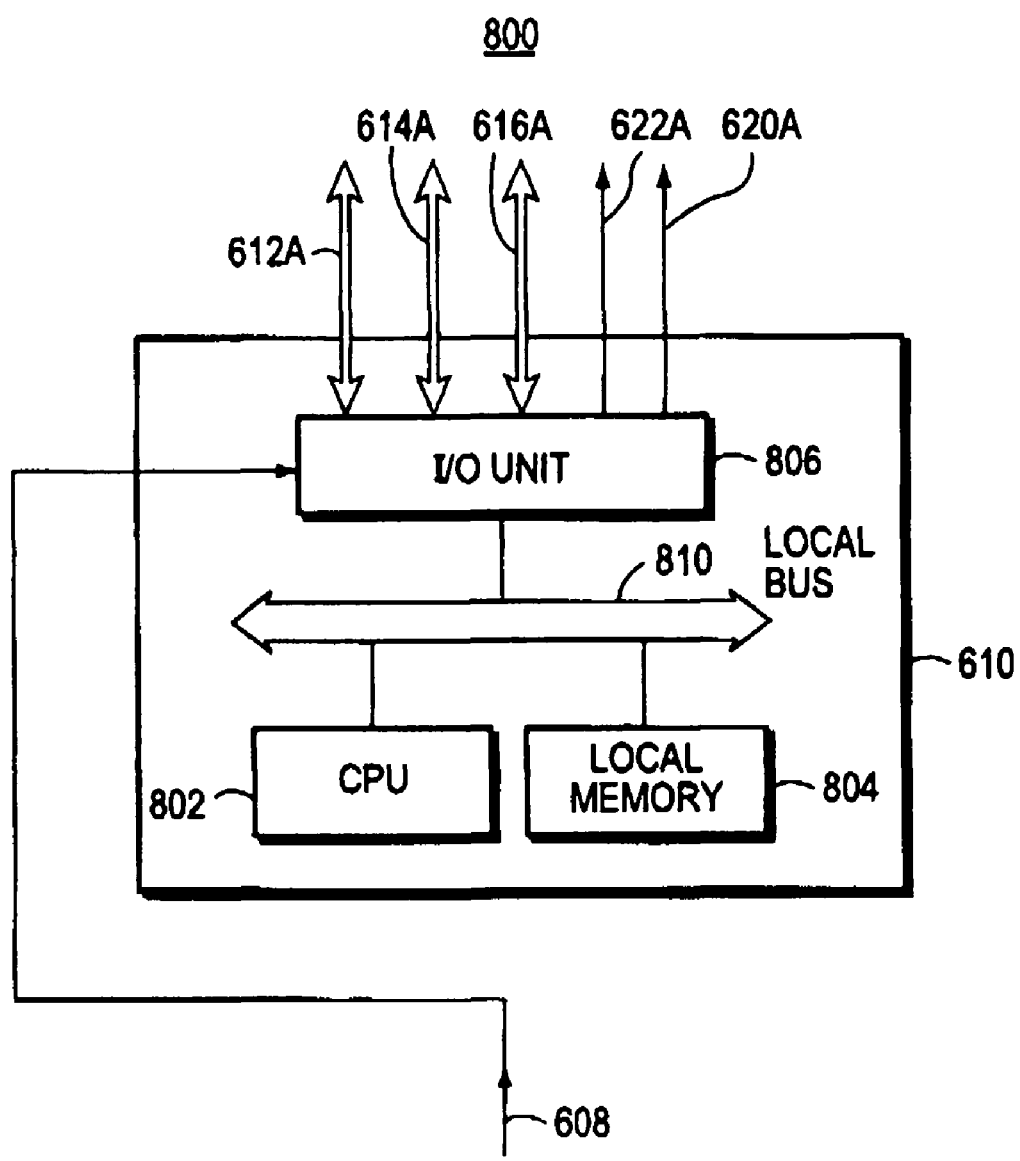
FIG. 8 is a block diagram of a packet classification unit implemented by a local CPU.

As a further alternative, packet classification unit 610 may be implemented as a processor, or CPU, having a local memory to store optimized code, as shown in FIG. 8. When packet classification unit 610 is implemented with a processor as shown in FIG. 8, then care must be exercised to insure that the processor is fast enough to handle the incoming packet rate which can develop on incoming path 604 and path 608. Packet classification unit 610 is shown as implemented by CPU 802, local memory 804, and input output unit (I/O unit) 806. A local bus 810 provides a communication path between CPU 802, local memory 804, and I/O unit 806. I/O unit 806 then provides communication to paths 608, 614A, 616A, 622A, and 620A, etc. Optimized software is stored in local memory 804 and executes on CPU 802 during packet classification operations.

A less efficient design could use the system CPU 622 to do packet classification, as older designs did. However the slow rate at which such a design can handle packets limits the usefulness of such a design.

Packet classification unit 610 has been presented as rapidly interpreting fields of layer 2 header, layer 3 header, and layer 4 header. As integrated circuits become larger and more capable, hardware packet classification units capable of interpreting layer 5 headers will become common. Already, packet classification units using software are available, where the packet classification unit can interpret layer 5 headers.

The important point for the invention is that a packet signaling to a network device have an indicia in a field interpreted by packet classification unit 610. Packet classification unit 610 can then pick out the one packet signaling that it must be sent to CPU 622 out of the gigabytes per second of network traffic arriving through path 604. The use of the "port" field in a URL serves well the purpose of signaling the network device because the layer 4 header, for example the TCP/IP header, is interpreted in present day network devices referred to a layer 4 switch, or as a router, etc. Alternative methods for signaling a network device by a data packet being forwarded by the network device, comprise: use a fixed server name which is reserved to indicate to a network device that the network device is to receive the packet; use of a field including a command such as INTERCEPT, where that field is interpreted by packet classification unit 610; and etc.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method of signaling in a computer network, comprising:
receiving, by a network device, a message transmitted by a client computer to a server, said message containing a Universal Resource Locator (URL), said URL having a particular reserved port designation;
detecting the particular reserved port designation by the network device;
in response to the detecting, intercepting the message at the network device, and not re-transmitting the message to the server or another device;
reading a command from the message, the command stored as a portion of the URL in the message, the command specifying a characteristic of a connection between the client computer and the server; and
executing, in response to said reading, the command by said network device.

2. The method as in claim 1 further comprising:
establishing by said network device, in response to said command, a designated quality of service for a communication session to said client computer.

3. The method as in claim 2 further comprising:
transmitting, by said network device, control messages to other network devices to establish said quality of service for said communication session.

4. The method as in claim 1 further comprising:
receiving by said client computer said URL having said particular reserved port designation in a file transmitted to said client computer by said server.

5. The method as in claim 4 further comprising:
receiving said file as a HTML file from said server; and
transmitting said message containing said URL by said client computer in response to a user requesting a resource displayed in a web page displayed by said client computer.

6. The method as in claim 1 further comprising:
transmitting by said network device to said client computer a redirect message, said redirect message redirecting to an address of said server without said particular reserved port designation.

7. The method as in claim 6 further comprising:
including in said redirect message a status of said network device, said status to be transmitted by said client computer to said server in a redirected message.

8. The method as in claim 1 further comprising:
establishing by said network device, in response to said command, a forwarding session for a multicast group to forward only multicast group packets having a source station indicated by an address carried in said command.

9. The method as in claim 1 further comprising:
implementing said network device as a router.

10. The method as in claim 1 further comprising:
implementing said network device as a switch.

11. The method as in claim 1 further comprising:
implementing said network device as a layer 4 switch.

12. A method of signaling a network device in a computer network, the network device located between a client computer and a server in the computer network, the method comprising the steps of:

receiving by the network device a message transmitted by the client, the message en route to the server, the message containing a Universal Resource Locator (URL) field;

detecting, by the network device, a specific port number stored in a first portion of the URL field;

in response to detecting the specific port number, interpreting a second portion of said URL field that is provided to store a path on the server and a query string for the server as a command to the network device rather than as a path and a query string; and executing the command by the network device, the command specifying a characteristic of a connection between the client and the server.

13. The method of claim 12 further comprising the step of:

in response to detecting the specific port number, intercepting the message by the network device, such that the message is prevented from reaching the server.

14. The method of claim 12 wherein the URL is stored in a Layer 4 Header.

15. The method of claim 12 wherein the first portion of the URL is a <port> portion of the URL.

16. The method of claim 12 wherein the second portion of the URL is a <path>?<searchpart> portion of the URL.

17. The method of claim 12 wherein a third portion of the URL is a <server> portion that stores a network address of the server.

18. The method as in claim 12 wherein the characteristic of the connection between the client computer and the server is a Quality of Service (QOS) category for the connection.

19. The method as in claim 12 wherein the characteristic of the connection between the client computer and the server is a source specific multicast, where the network device only forwards multicast group messages having both a group address and a source address contained in the URL field.

20. The method of claim 12 wherein the command is structured according to a CMD&{ARGx=<argx>} format, where CMD is a command word and {ARGx=<argx>} is a list of arguments.

21. A network device for use in a computer network, the network device comprising:

a network circuit configured to receive a message transmitted by a client, the message en route to a server;

a packet classification unit configured to parse a Universal Resource Locator (URL) field in the message and to detect a specific port number stored in a first portion of the URL field and to, in response to the specific port number, forward the message to a processor; and the processor configured to interpret a second portion of said URL field that is provided to store a path on the server and a query string for the server as a command to the network device rather than as a path and a query string , and to execute the command, the command specifying a characteristic of a connection between the client and the server.

22. The network device of claim 21 the URL is stored in a Layer 4 Header.

23. The network device of claim 21 wherein the first portion of URL is a <port> portion of the URL.

24. The network device of claim 21 wherein the second portion of the URL is a <path>?<searchpart> portion of the URL.

25. The network device of claim 21 wherein a third portion of the URL is a <server> portion that stores a network address of the server.

26. The network device of claim 21 wherein the characteristic of the connection between the client computer and the server is a Quality of Service (QOS) category for the connection.

27. The network device of claim 21 wherein the characteristic of the connection between the client computer and the server is a source specific multicast, where the network device only forwards multicast group messages having both a group address and a source address contained in the URL field.

28. The network device of claim 21 wherein the command is structured according to a CMD&{ARGx=<argx>} format, where CMD is a command word and {ARGx=<argx>} is a list of arguments.

29. An apparatus for signaling in a computer network, comprising:

a network device configured to intercept and not re-transmit a message transmitted by a client computer to a server or another device if said message contains a Universal Resource Locator (URL) having a particular reserved port designation, said network device further configured to parse said message to determine if said particular reserved port designation is present; and a processor in said network device configured to execute a command in response to the message, said command carried in a portion of the URL in said message, said command specifying a characteristic of a connection between the client computer and the server.

30. The apparatus as in claim 29 further comprising:
said network device is a router.

31. The apparatus as in claim 29 further comprising:
said network device is a switch.

32. The apparatus as in claim 29 further comprising:
said network device is a layer 4 switch.

33. The apparatus as in claim 29 further comprising:
said network device uses a packet classification unit implemented in hardware to filter a field of said message containing said particular reserved port designation.

34. A method comprising:

receiving, at a network device located between a client computer and a server in a computer network, an Hypertext Transfer Protocol (HTTP) REQUEST message transmitted by the client computer, the message en route to the server, the message containing a Universal Resource Locator (URL) field including an address of the server and a specific port number;

detecting the specific port number stored in the URL field of the HTTP REQUEST message, and in response thereto, intercepting the HTTP REQUEST message to prevent the HTTP REQUEST message from reaching the server, and establishing a connection to the client computer from the network device;

receiving, at the network device, a HTTP GET message transmitted by the client computer, the message en route to the server, the message containing a URL field including an address of the server and the specific port number;

detecting the specific port number stored in the URL field of the HTTP GET mesas sage, and in response thereto, intercepting the HTTP GET message to prevent the HTTP GET message from reaching the server, and interpreting a <path>?<searchpart> portion of the URL field of the HTTP GET message as a command to the network device rather than as a path on the server or a query string for the server, wherein the command specifies a characteristic of a connection between the client computer and the server;

executing the command.

35. The method of claim 34 further comprising:
sending a redirect message to the client computer, the redirect message including a URL field that includes the address of the server but does not include the specific port number, to cause the client computer to transmit messages that do not include the specific port number.

36. The method as in claim 34 wherein the characteristic of the connection between the client computer and the server is a Quality of Service (QOS) category for the connection.

37. The method as in claim 34 wherein the characteristic of the connection between the client computer and the server is a source specific multicast, where the network device only forwards multicast group messages having both a group address and a source address contained in the URL field.

38. The network device of claim 34 wherein the command is structured according to a CMD&{ARGx=<argx>} format, where CMD is a command word and {ARGx=<argx>} is a list of arguments.

39. A method of signaling in a computer network, comprising:
intercepting by a network device a message transmitted by a client computer to a server and not re-transmitting the message to the server or another device, said message containing a Universal Resource Locator (URL), said URL having a reserved port designation;
executing, in response to said reserved port designation, a command by said network device, said command carried in said message, said command specifying a characteristic of a connection between the client computer and the server;
displaying a web page by said client computer, said web page received from a previously contacted computer;
requesting a resource displayed by said web page by a user of said client computer;
transmitting by said client computer, in response to said requesting step, a REQUEST message to a second server; and
transmitting by said second server, in response to receipt of said REQUEST message, a second web page containing said URL having a reserved port designation in a command which automatically transmits a message to said URL as said second web page is being executed by a browser program on said client computer.

40. A method of signaling in a computer network, comprising:
transmitting by a client computer a message to a server, said message containing a Universal Resource Locator (URL), said URL having a particular reserved port designation;
intercepting, in response to said particular reserved port designation, said message by a network device and not re-transmitting the message to the server or another device;
reading a command from the message by the network device, the command stored as a portion of the URL in the message, the command specifying a characteristic of a connection between the client computer and the server; and
executing, in response to said particular reserved port designation, the command by said network device.

41. A method of signaling in a computer network, comprising:
receiving by a client computer a Universal Resource Locator (URL) having a particular reserved port designation in a file transmitted to said client computer by a server;
displaying said file as a web page by said client computer;
transmitting a message containing said URL by said client computer in response to a user requesting a resource displayed in said web page, said message transmitted to said server;
intercepting, in response to said particular reserved port designation in said URL in said message, said message by a network device, and not re-transmitting said message to said server or another device; and
executing, in response to said particular reserved port designation, a command by said network device, said command carried in said message as a portion of the URL of the message, said command specifying a characteristic of a connection between the client is computer and the server.

42. An apparatus for signaling in a computer network, comprising:
means for intercepting and not re-transmitting to another device a message transmitted by a client computer to a server, said message containing a Universal Resource Locator (URL), said URL having a particular reserved port designation, said means for intercepting including means for parsing said message to determine if said particular reserved port designation is present; and
means, responsive to the means for intercepting said message, for executing a command, said command carried in a portion of the URL in said message, said command specifying a characteristic of a connection between the client computer and the server.

* * * * *

UNITED STATES PATENT AND TRADEMARK OFFICE
CERTIFICATE OF CORRECTION

PATENT NO. : 7,761,500 B1
APPLICATION NO. : 09/515941
DATED : July 20, 2010
INVENTOR(S) : Liming Wei It is certified that error appears in the above-identified patent and that said Letters Patent is hereby corrected as shown below:

Col. 2, Line 47, please amend as shown:

do[[ modern]] modem layer 4 switches and routers. Uses of the invention

Col. 3, Line 6, please amend as shown:

implemented by a semiconductor[[ is]] chip.

Col. 5, Line 56, please amend as shown:

name, such as[[ to]] "comp.infosystems.www.misc". A <mes-

Col. 19, Line 32, please amend as shown:

Web page is received by the user's[[ is]] browser program which

Col. 20, Line 65, please amend as shown:

device can make sue of a Status 302 message (described[[ to]]

Col. 23, Line 53, please amend as shown:

distinguished by the network devices, and are simply[[ zo]] for-

Col. 26, Line 24, please amend as shown:

instructions useful to operation of network[[ is]] device 500.

Col. 27, Line 28, please amend as shown:

reliable transport implemented in the transport[[ is]] layer is

Col. 27, Line 59, please amend as shown:

device part of the invention are stored in[[ to]] data structure 540

Col. 32, Line 58, please amend as shown:

of the HTTP GET[[ mesas sage]] message, and in response thereto,

Signed and Sealed this

Sixteenth Day of November, 2010

David J. Kappos
*Director of the United States Patent and Trademark Office*

Col. 34, Line 31, please amend as shown:

of a connection between the client[[ is]] computer and the